(12) United States Patent    (10) Patent No.:   US 12,590,497 B2

Jabari et al.    (45) Date of Patent:   Mar. 31, 2026

(54) UNTETHERED DOWNHOLE TOOLS

(71) Applicant: Saudi Arabian Oil Company, Dhahran (SA)

(72) Inventors: Rami Jabari, Houston, TX (US); Thomas Hillman, Missouri City, TX (US); Max Deffenbaugh, Fulshear, TX (US); Abubaker Saeed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/912,188

(22) Filed: Oct. 10, 2024

(65) Prior Publication Data

US 2025/0116166 A1    Apr. 10, 2025

Related U.S. Application Data

(60) Provisional application No. 63/589,187, filed on Oct. 10, 2023.

(51) Int. Cl.
   *E21B 23/00*      (2006.01)
   *B25J 11/00*      (2006.01)
      (Continued)

(52) U.S. Cl.
   CPC ............. *E21B 23/001* (2020.05); *B25J 11/00* (2013.01); *B25J 13/006* (2013.01); *B63G 8/001* (2013.01);
      (Continued)

(58) Field of Classification Search
   CPC ........ E21B 23/001; E21B 23/01; E21B 34/02; E21B 47/022; E21B 47/06; E21B 47/08; E21B 47/13; E21B 47/14; E21B 49/08; E21B 33/037; B25J 11/00; B25J 13/006; B63G 8/001; B63G 8/08; B63G 8/22; B63G 2008/004; H02H 7/20

See application file for complete search history.

(56) References Cited

U.S. PATENT DOCUMENTS 4,676,310 A    6/1987   Scherbatskoy et al.
4,855,820 A    8/1989   Barbour
      (Continued)

FOREIGN PATENT DOCUMENTS

WO    WO 2016149199 A1    9/2016
WO    WO 2019067395 A1    4/2019
      (Continued)

OTHER PUBLICATIONS

U.S. Appl. No. 18/910,946, filed Oct. 9, 2024, Jabari et al.
      (Continued)

*Primary Examiner* — James G Sayre

(74) *Attorney, Agent, or Firm* — Fish & Richardson P.C.

(57) ABSTRACT

An untethered downhole tool includes a housing and a propeller. The housing is configured to house a logging tool and a power supply. The housing defines a longitudinal axis. The propeller includes a propeller blade. The propeller is coupled to the power supply for receiving power from the power supply to rotate. The propeller is positioned at an end of the housing such that the axis of rotation of the propeller is substantially parallel and/or inline with the longitudinal axis of the housing for the untethered downhole tool to traverse a well.

18 Claims, 12 Drawing Sheets

(51) Int. Cl.

| | |
|---|---|
| *B25J 13/00* | (2006.01) |
| *B63G 8/00* | (2006.01) |
| *B63G 8/08* | (2006.01) |
| *B63G 8/22* | (2006.01) |
| *E21B 23/01* | (2006.01) |
| *E21B 34/02* | (2006.01) |
| *E21B 47/022* | (2012.01) |
| *E21B 47/06* | (2012.01) |
| *E21B 47/08* | (2012.01) |
| *E21B 47/13* | (2012.01) |
| *E21B 47/14* | (2006.01) |
| *E21B 49/08* | (2006.01) |
| *H02H 7/20* | (2006.01) |

(52) U.S. Cl.
CPC ................. *B63G 8/08* (2013.01); *B63G 8/22* (2013.01); *E21B 23/01* (2013.01); *E21B 34/02* (2013.01); *E21B 47/022* (2013.01); *E21B 47/06* (2013.01); *E21B 47/08* (2013.01); *E21B 47/13* (2020.05); *E21B 47/14* (2013.01); *E21B 49/08* (2013.01); *H02H 7/20* (2013.01); *B63G 2008/004* (2013.01)

(56) References Cited

U.S. PATENT DOCUMENTS

| | | | |
|---|---|---|---|
| 5,515,924 | A | 5/1996 | Osterhoudt, III |
| 6,241,028 | B1 | 6/2001 | Bijleveld et al. |
| 6,431,270 | B1 | 8/2002 | Angle |
| 6,845,819 | B2 | 1/2005 | Barrett et al. |
| 7,363,967 | B2 | 4/2008 | Burris, II et al. |
| 7,819,189 | B1 | 10/2010 | Cosby |
| 8,276,674 | B2 | 10/2012 | Lopez de Cardenas et al. |
| 9,328,577 | B2 | 5/2016 | Hallundbaek et al. |
| 9,476,274 | B2 | 10/2016 | Edmonstone et al. |
| 9,611,020 | B2 | 4/2017 | Ulgen |
| 9,873,499 | B2 | 1/2018 | Austin et al. |
| 10,001,007 | B2 | 6/2018 | Pelletier et al. |
| 10,605,037 | B2 | 3/2020 | Eitschberger et al. |
| 10,696,365 | B2 | 6/2020 | Dabbous et al. |
| 11,268,335 | B2 | 3/2022 | Vick, Jr. et al. |
| 11,578,590 | B2 | 2/2023 | Deffenbaugh et al. |
| 11,781,403 | B2 | 10/2023 | Prisbell et al. |
| 2002/0096322 | A1 | 7/2002 | Barrett et al. |
| 2005/0175458 | A1 | 8/2005 | Vasquez |
| 2005/0241825 | A1 | 11/2005 | Burris, II et al. |
| 2006/0157239 | A1 | 7/2006 | Ramos et al. |
| 2009/0126938 | A1 | 5/2009 | White |
| 2011/0253373 | A1 | 10/2011 | Kumar et al. |
| 2013/0228326 | A1 | 9/2013 | Griffith et al. |
| 2013/0319661 | A1 | 12/2013 | Xiao et al. |
| 2014/0311755 | A1 | 10/2014 | Al-Badran |
| 2015/0251941 | A1 | 9/2015 | Clark |
| 2016/0251941 | A1 | 9/2016 | Murphree et al. |
| 2019/0332089 | A1 | 10/2019 | Deffenbaugh et al. |
| 2020/0157909 | A1 | 5/2020 | Fernandes et al. |
| 2020/0300053 | A1 | 9/2020 | Fernandes et al. |
| 2021/0131209 | A1* | 5/2021 | He ........................ E21B 23/00 |
| 2022/0290533 | A1* | 9/2022 | Prisbell ................ E21B 43/116 |
| 2023/0184104 | A1 | 6/2023 | Deffenbaugh et al. |
| 2023/0382502 | A1 | 11/2023 | Montague et al. |
| 2024/0301772 | A1 | 9/2024 | Al-Mashhad et al. |

FOREIGN PATENT DOCUMENTS

| | | |
|---|---|---|
| WO | WO 2020197665 A1 | 10/2020 |
| WO | WO 2021002918 A2 | 1/2021 |
| WO | WO 2021074483 A1 | 4/2021 |
| WO | WO 2022192919 A1 | 9/2022 |
| WO | WO-2023187458 A1 * | 10/2023 ........... E21B 23/001 |

OTHER PUBLICATIONS

U.S. Appl. No. 18/911,320, filed Oct. 10, 2024, Jabari et al.
U.S. Appl. No. 18/912,094, filed Oct. 10, 2024, Jabari et al.
Hillman et al., "Range and Design of Untethered Downhole Vehicles," IEEE, paper presented at the Oceans 2023—MTS/IEEE U.S. Gulf Coast Conference, Biloxi, Mississippi, USA, Sep. 25-28, 2023, pp. 1-7, 7 pages.
Seren et al., "An Untethered Sensor Platform for Logging Vertical Wells," IEEE Transactions on Instrumentation and Measurement, Apr. 2018, 67(4):798-803, 5 pages.
International Search Report and Written Opinion in International Appln. No. PCT/US2024/050672, mailed on Nov. 29, 2024, 14 pages.
International Search Report and Written Opinion in International Appln. No. PCT/US2024/050742, mailed on Nov. 29, 2024, 14 pages.
International Search Report and Written Opinion in International Appln. No. PCT/US2024/050735, mailed on Nov. 29, 2024, 14 pages.
International Search Report and Written Opinion in International Appln. No. PCT/US2024/050748, mailed on Nov. 29, 2024, 15 pages.

* cited by examiner

PERSPECTIVE VIEW
200A
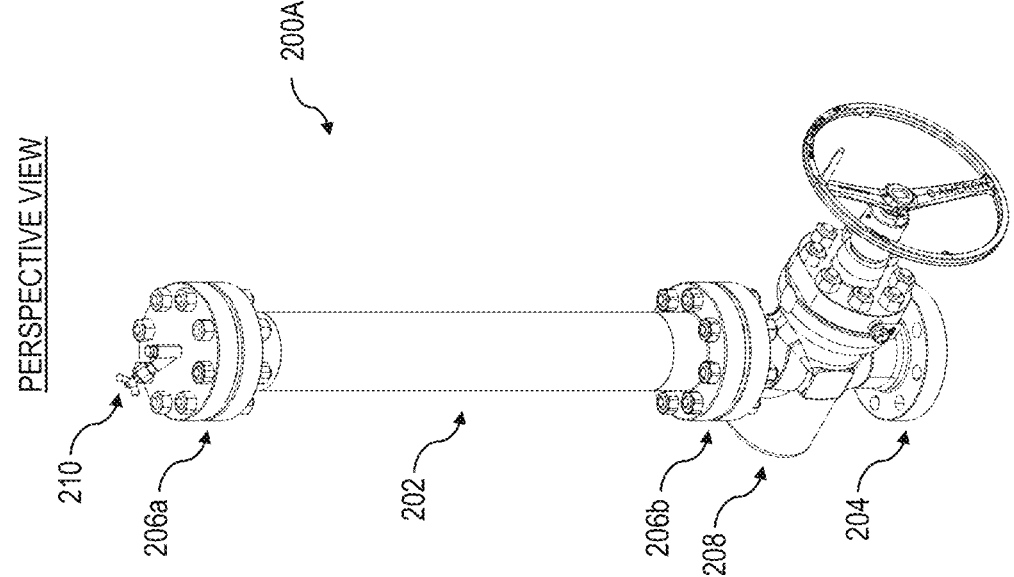
210
206a
202
206b
208
204
SIDE VIEW
200A
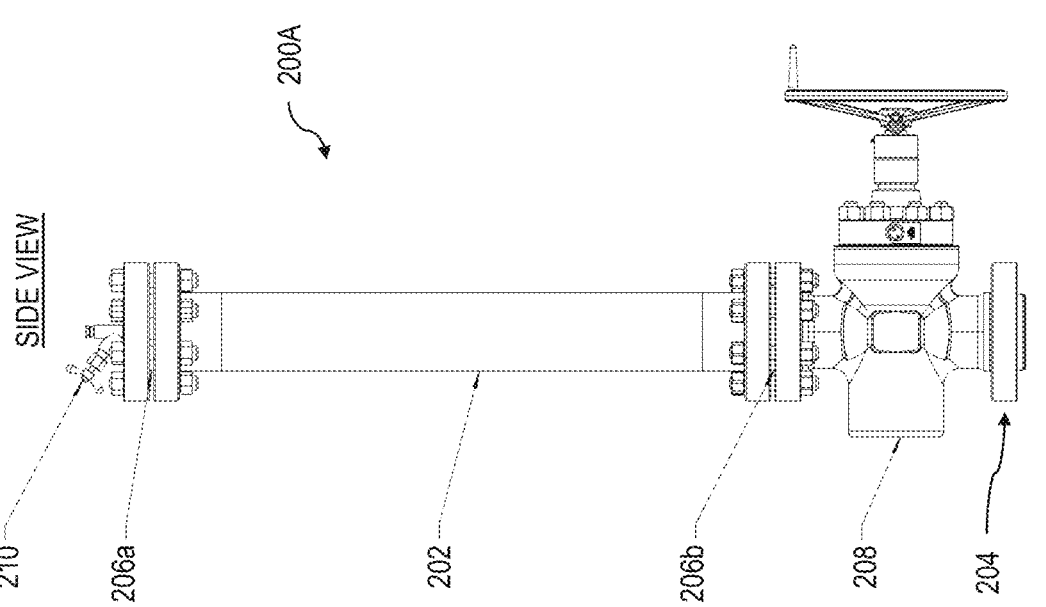
210
206a
202
206b
208
204
FIG. 2A

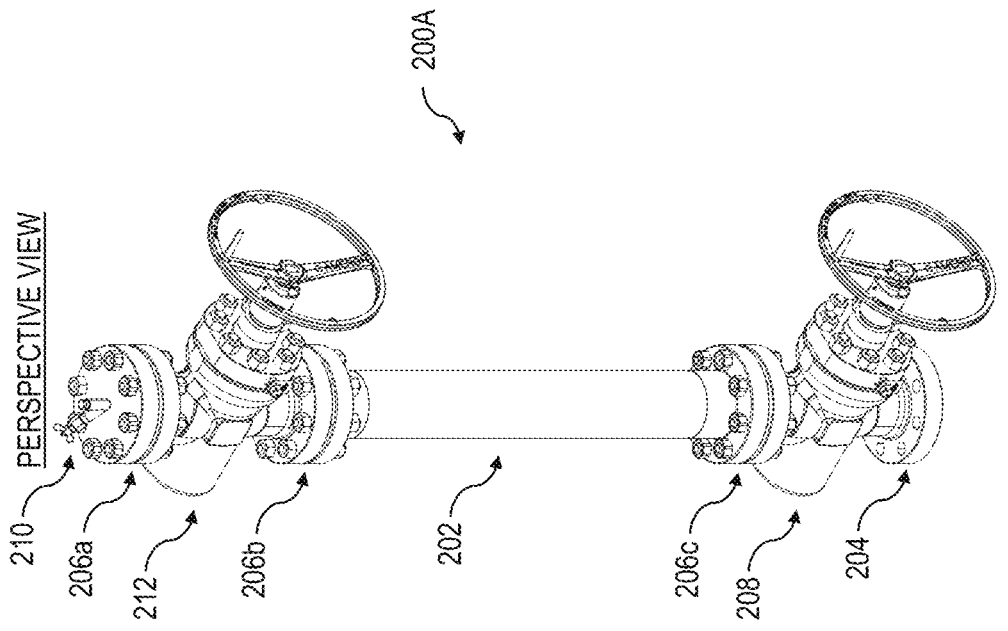
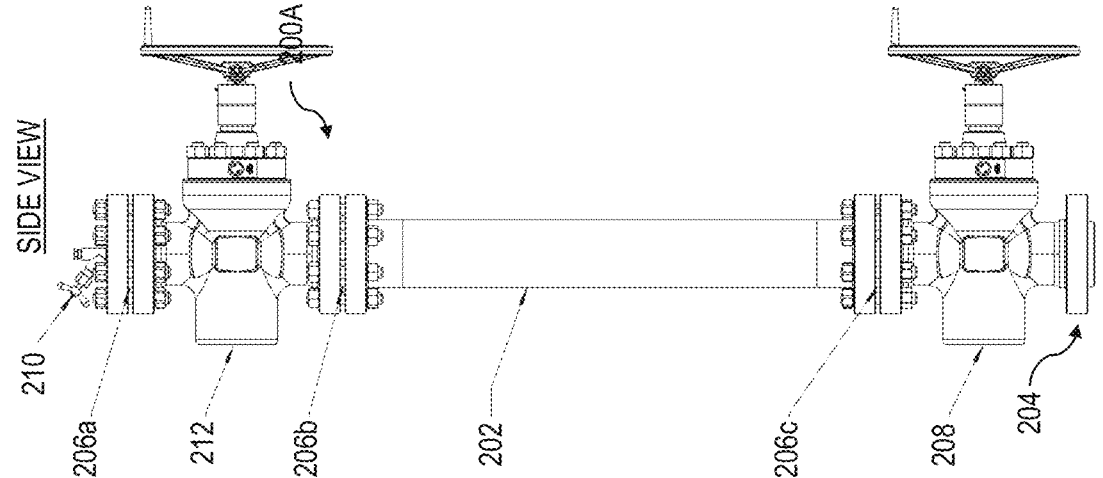
FIG. 2B

300

300

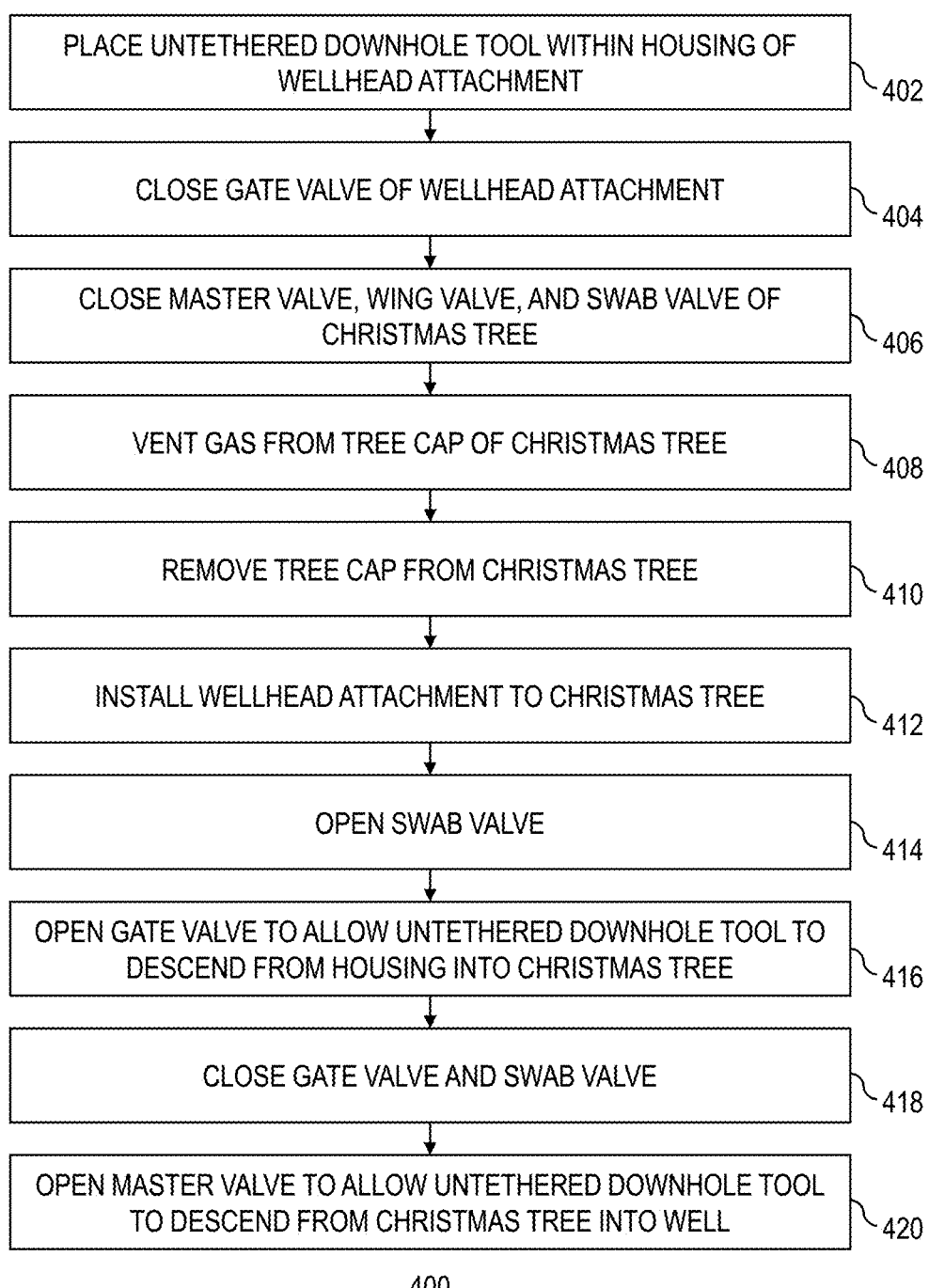

PLACE UNTETHERED DOWNHOLE TOOL WITHIN HOUSING OF WELLHEAD ATTACHMENT — 402

CLOSE GATE VALVE OF WELLHEAD ATTACHMENT — 404

CLOSE MASTER VALVE, WING VALVE, AND SWAB VALVE OF CHRISTMAS TREE — 406

VENT GAS FROM TREE CAP OF CHRISTMAS TREE — 408

REMOVE TREE CAP FROM CHRISTMAS TREE — 410

INSTALL WELLHEAD ATTACHMENT TO CHRISTMAS TREE — 412

OPEN SWAB VALVE — 414

OPEN GATE VALVE TO ALLOW UNTETHERED DOWNHOLE TOOL TO DESCEND FROM HOUSING INTO CHRISTMAS TREE — 416

CLOSE GATE VALVE AND SWAB VALVE — 418

OPEN MASTER VALVE TO ALLOW UNTETHERED DOWNHOLE TOOL TO DESCEND FROM CHRISTMAS TREE INTO WELL — 420

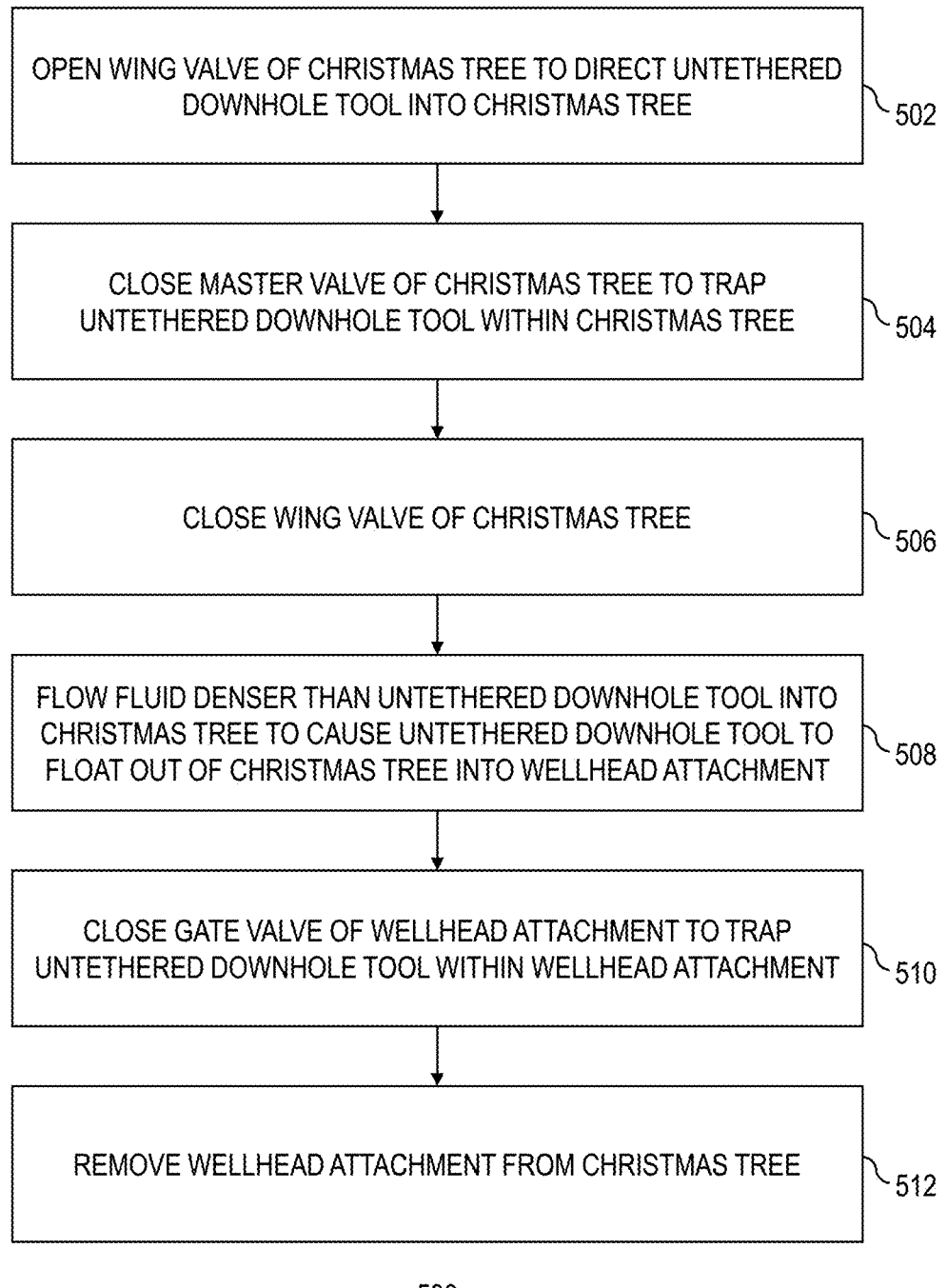

OPEN WING VALVE OF CHRISTMAS TREE TO DIRECT UNTETHERED DOWNHOLE TOOL INTO CHRISTMAS TREE ⟍502

CLOSE MASTER VALVE OF CHRISTMAS TREE TO TRAP UNTETHERED DOWNHOLE TOOL WITHIN CHRISTMAS TREE ⟍504

CLOSE WING VALVE OF CHRISTMAS TREE ⟍506

FLOW FLUID DENSER THAN UNTETHERED DOWNHOLE TOOL INTO CHRISTMAS TREE TO CAUSE UNTETHERED DOWNHOLE TOOL TO FLOAT OUT OF CHRISTMAS TREE INTO WELLHEAD ATTACHMENT ⟍508

CLOSE GATE VALVE OF WELLHEAD ATTACHMENT TO TRAP UNTETHERED DOWNHOLE TOOL WITHIN WELLHEAD ATTACHMENT ⟍510

REMOVE WELLHEAD ATTACHMENT FROM CHRISTMAS TREE ⟍512

HOUSE LOGGING TOOL AND POWER SUPPLY WITHIN HOUSING ⟍602

ROTATE FIRST PROPELLER IN FIRST DIRECTION ⟍604

ROTATE SECOND PROPELLER IN SECOND DIRECTION OPPOSITE OF FIRST DIRECTION ⟍606

OBTAIN LOGGING DATA ABOUT WELL ⟍608

600

750

850

UNTETHERED DOWNHOLE TOOLS

CROSS-REFERENCE TO RELATED APPLICATION

This application claims the benefit of U.S. Provisional Application Ser. No. 63/589,187 entitled "DOWNHOLE ROBOT FOR OIL WELLS" and filed on Oct. 10, 2023, which is incorporated by reference herein in its entirety.

TECHNICAL FIELD

This disclosure relates to untethered downhole tools for logging and intervention operations in hydrocarbon wells. In particular, this disclosure relates to deployment of, controlling, and steering of such untethered downhole tools.

BACKGROUND

Hydrocarbon wells (including producing wells, injection wells, and monitoring wells) must be accessed to obtain measurements, log (i.e., obtain measurements along an interval), inspect (such as for corrosion or scale buildup), and monitor downhole conditions (i.e., such as monitoring inflow along an interval of the well). Wells are also accessed to deploy chemical treatments such as to inhibit corrosion or scale or to increase productivity or recovery. Wells are also accessed to perform interventions such as to remove sand or debris or to perforate casing.

Accessing a well or conveying a tool or sensor into the well for all these purposes is costly and requires extensive surface equipment. Some examples of conventional methods for access or conveyance include coiled tubing, tractors, and tethered (e.g., wireline, e-line, slick-line) tools. These are all connected by a tether, cable, tubing, or wireline cable to the surface. As a result, they require auxiliary surface equipment, which can be difficult to mobilize and can require extensive crews to operate.

Typical conventional untethered robotic systems are tractor based, for example, having wheels or tracks that have traction against the wellbore wall to move the vehicle along the well. Such systems may require significant force against the wellbore wall to maintain traction. Overcoming the resulting friction between the moving parts can require a significant amount of energy, making the vehicles inefficient and limiting their speed and range.

SUMMARY

Systems and methods are described for a way to convey sensors, chemical treatments, or intervention tools to downhole locations within oil or gas wells, particularly wells that contain one or more laterals (horizontal intervals). The subject matter described in this disclosure can be implemented in particular implementations, so as to realize one or more of the following advantages. Many conventional downhole tools are connected to the surface by some tether such as a slickline cable, wireline cable, or coiled tubing connection. This tether may serve to move such tools or restrain their movement within the well. The tether may also serve to provide electrical power to the tool as in the case of a wireline cable. In contrast, the downhole tools described in this disclosure are untethered, having no such tether or physical connection to the surface. This eliminates the need for large and expensive wireline handling systems or coiled tubing handling systems at the surface, significantly reducing the cost of downhole operations. To fully realize the benefits of untethered downhole tools, a way to safely and easily deploy them into wells is desired. Some wells have an elevated internal pressure (pressure greater than atmospheric pressure) near the surface where the wellhead is located. Deploying or recovering a tool from such pressurized wells requires managing this pressure so that pressurized fluids from within the well do not escape. In many cases, safe field operations require maintaining at least two pressure barriers, such as closed valves, between the inside of the well and the outside environment at all times. In some cases, there is a gas cap at the top of wells, where the top (0 feet to 300 feet or more) may be filled with methane or other downhole gasses above the liquids level in the well. In such cases, even a downhole tool which is able to float or propel itself upward in the lightest crude oil would be unable to reach the top of the well due to not being able to float or propel upward through the gas. Accordingly, there is a need for an apparatus and method for deploying untethered downhole tools into wells which have elevated internal pressure and may have a gas cap, while maintaining two pressure barriers.

Further, the untethered downhole tools described can overcome frictional forces while traversing a well, such that the untethered downhole tools remain neutrally buoyant while traversing the well. The wellhead attachments described can be used to deploy the described untethered downhole tools in an efficient manner while maintaining the pressure barrier of protection between the well contents and the surrounding environment (such as the surface). The untethered downhole tools described are versatile and can be semi-autonomous, autonomous, operated under supervised autonomy, remotely operated, or automated. The untethered downhole tools described do not rely on buoyancy forces to traverse a well. The propellers of the described untethered downhole tools are coaxial and counter-rotate, which improves thrust efficiency and cancels torque while traversing a well. The downhole tools described are untethered, having no physical connection, such as a wireline cable or coiled tubing extending from the surface. The untethered nature of the described downhole tools eliminates the need for large and expensive wireline handling systems or coiled tubing handling systems at the surface, thereby significantly reducing the cost of downhole operations. The downhole tools described are also substantially neutrally buoyant, propeller-driven, and have minimal, low-force contact with the wellbore wall. The neutrally buoyant nature of the described downhole tools enables them to traverse long wells using only the energy carried in internal power supplies (such as batteries). The described downhole tools enable well logging and intervention operations to be performed as autonomous operations. The described downhole tools can perform logging and intervention operations underground while the well is safely shut off at the surface without requiring human supervision, thereby greatly reducing the manpower required for such downhole operations. Finally, the described downhole tools require minimal energy to perform downhole operations (e.g., logging and intervention), and they can be smaller and less expensive compared to conventional downhole tools, thereby reducing the logistical complexity and delays often associated with conventional downhole tools that utilize wireline or coiled tubing.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 2A is a schematic diagram showing side and perspective views of an example wellhead attachment that can be used to deploy untethered downhole tools into the well of FIG. 1.

FIG. 2B is a schematic diagram showing side and perspective views of an example wellhead attachment that can be used to deploy untethered downhole tools into the well of FIG. 1.

FIG. 4 is a flow chart of an example method for deploying the untethered downhole tool of FIG. 3A into the well of FIG. 1.

FIG. 5 is a flow chart of an example method for retrieving an untethered downhole tool of FIG. 3A from the well of FIG. 1.

DETAILED DESCRIPTION

Figure 1:
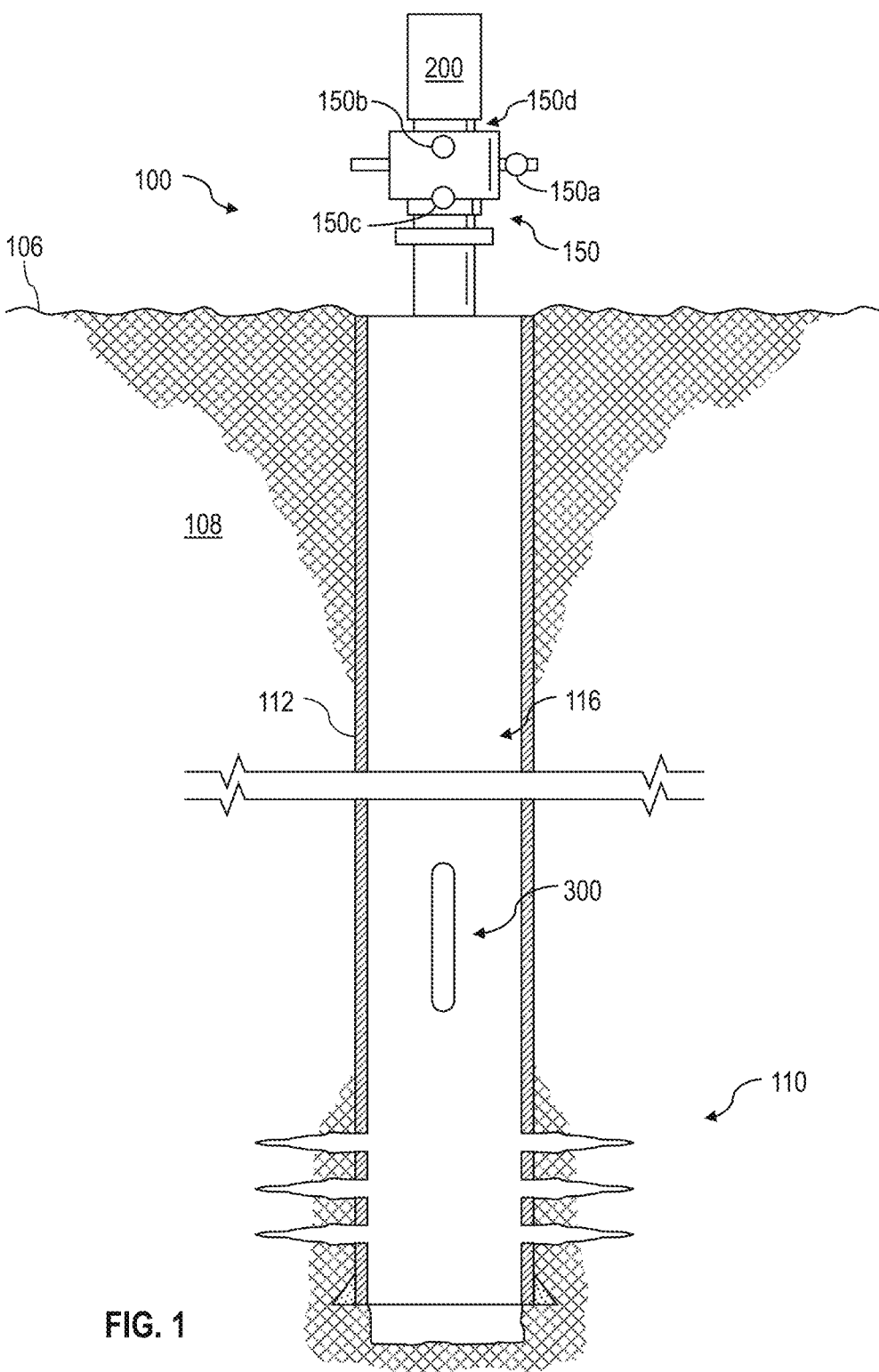
FIG. 1 is a schematic diagram of an example well.

In a previous study, an untethered logging tool was developed, which was inserted into a well, descended to a target depth, increased buoyancy (for example by dropping a weight), and then floated back to the surface. However, since this tool relied on buoyancy forces for motion, it was limited to operating in vertical/deviated wells and could not access laterals. Previous research presented a downhole drone with multiple, non-coaxially mounted propellers, which are pivotably coupled to the vehicle body. This had the disadvantage of lower propulsion efficiency as energy was expended to offset the buoyancy of the vehicle and the thrust vectors of the propellers were not aligned with the axis of the vehicle, but rather were turned to steer the vehicle.

Accordingly, there is a need for conveyance method for downhole tools that is not tethered to the surface, offers fast, efficient propulsion, and can access the lateral portion of wells. The concepts described provide a downhole tool for operation in a wellbore which is 1) untethered, 2) substantially neutrally buoyant in the wellbore fluids, 3) moved by a propeller in contact with the wellbore fluids rather than being moved by cables or coiled tubing from the surface or by wheels or tracks in contact with the wellbore wall, and 4) carries sensors for measuring downhole properties.

This disclosure describes a propeller-driven, untethered downhole tool. The untethered downhole tool can be used for downhole measurement, logging and intervention operations. This disclosure describes specifically methods and systems for control of the motion of propeller-driven untethered downhole tools. Untethered downhole tools eliminate the need for extensive surface equipment, large crews, and unnecessary downtime. A topworks launching system can be added to a well to enable simple deployment of an untethered downhole tool, while maintaining the pressure barrier of protection between well contents and the environment. The topworks launching system includes a pipe. The pipe can have approximately the same diameter as the vertical clearance through the wellhead of the well. The pipe has a length that is equal to or greater than the untethered downhole tool that is to be deployed, such that the entire untethered downhole tool can fit within the pipe. A mounting flange or connector is located at a lower end of the pipe. The well's tree cap (or optionally the tree cap assembly including both the cap and the fitting which the cap screws onto) can be removed, and the pipe can be attached to the top of the well by the mounting flange or connector. A valve is located at an upper end of the pipe. In some implementations, a gate valve is location near the lower end of the pipe, immediately above the mounting flange or connector. The untethered downhole tool can be deployed into the well through the topworks launching system. Once launched from the topworks launching system, the untethered downhole tool descends into the well and performs downhole operations (such as logging).

This disclosure describes a propeller-driven, untethered downhole tool. The untethered downhole tool can be used for downhole measurement/logging applications. Untethered downhole tools eliminate the need for extensive surface equipment, large crews, and unnecessary downtime. The untethered downhole tool is neutrally buoyant, meaning that the tool is within +/−10% neutral buoyancy in its surrounding fluid (downhole fluids). The untethered downhole tool can have a passive or active centralization apparatus for centering the untethered downhole tool within the wellbore. The untethered downhole tool can include counter-rotating propellers. of-mass/center-of-buoyancy separation perpendicular to the vehicle axis (e.g., longitudinal axis). Drive by propeller of a neutrally-buoyant, untethered downhole tool enables extended vehicle range and high efficiency but presents some design challenges in the downhole environment. When propellers spin, they exert a force along their axis of rotation, but they also exert a torque around that axis opposite to their direction of rotation. In surface craft or underwater vehicles, this torque typically causes the vehicle to roll a few degrees to the point where the torque produced by the center-of-mass/center-of-buoyancy separation cancels the propeller torque, preventing the vehicle from spinning. A downhole tool can travel in both vertical and horizontal orientations, and it may be difficult to create a center-of-mass/center-of-buoyancy separation that is appropriate to stabilize both vehicle orientations without misaligning the axis of the vehicle and the axis of the well. Additionally, the small diameter of subsurface wells may require long and thin vehicle geometries, prevents a large center-of-mass/center-of-buoyancy separation perpendicular to the vehicle axis (e.g., longitudinal axis).

The described untethered downhole tool has low power requirements for propulsion due to the low frictional losses enabled by the substantially neutrally buoyant downhole tool, which allows the vehicle to traverse lateral wells using only the power it carries (e.g., in batteries) without additional power needing to be provided from the surface.

As used in this disclosure, the term "untethered" means that there is no cable or tubing connecting the vehicle with the surface. The vehicle carries all the energy it needs to complete a mission in its internal batteries or other energy storage devices.

As used in this disclosure, the term "downhole vehicle" means a mobility platform or means of conveyance suitable for carrying sensors or measurement instruments, chemical treatments, or intervention tools into the downhole environment and suitable for operation at the high temperature and pressure and corrosive environment of oil or gas wells. In one embodiment, the vehicle comprises a pressure housing that excludes the downhole fluid from an internal gas-filled or vacuum volume which provides buoyancy and optionally contains and protects electronic components and or batteries that are not able to operate unprotected in the downhole fluids. In one embodiment, the vehicle pressure housing is substantially cylindrical, at least in the midsection of the vehicle. Optionally the pressure housing is tapered at the ends of the vehicle to facilitate uniform flow of the fluid displaced by the vehicle through the annulus between the vehicle and the wellbore as the vehicle moves. In one embodiment, the diameter of the vehicle at its midsection is a substantial fraction (25% to 80%) of the smallest diameter in the well (which may be the inner diameter of the production tubing, or the casing diameter in the case of a cased completion with no tubing, or the diameter of the borehole in the case a barefoot (uncased) completion. In one embodiment, the length of the vehicle is at least double the diameter of the wellbore. This combination of radius and diameter means that the longitudinal axis of the vehicle remains substantially aligned with the longitudinal axis of the well, and the direction of the vehicle can be guided by the wellbore.

As used in this disclosure, the terms "substantially neutrally buoyant" mean that the effective density of the vehicle, by which we mean the mass of the vehicle divided by its volume, is substantially equal to the average density of the downhole fluids around the vehicle. By "substantially equal" we mean in one embodiment that the effective density of the vehicle is within +/−20% of the average density of the downhole fluids around the vehicle. By "substantially neutrally buoyant" we mean in one embodiment that the frictional force from maintaining vehicle centralization in the wellbore (a force that depends on the buoyancy mismatch between the vehicle and the wellbore fluids) is no more than the drag force on the vehicle that must be overcome for forward motion.

As used in this disclosure, the terms "moved by a propeller" mean that the thrust to accomplish motion along the axis of the vehicle is provided by a propeller that acts on the fluids in the wellbore rather than by wheels or tracks that act on the wellbore wall. In one embodiment, the axis of the propeller is the same as the axis of the vehicle, such that the propeller generates thrust along the axis of the vehicle.

As used in this disclosure, the terms "carries sensors" mean that the vehicle will carry sensors to measure properties of interest outside the vehicle as well as sensors to determine the properties of the vehicle. Sensors for outside the vehicle may include but are not limited to: temperature, pressure, fluid flow rate, fluid composition (including chemical composition and/or phase composition such as water fraction or gas volume fraction), fluid density, fluid viscosity, pipe or wellbore diameter or geometry, corrosion, scale, sand deposits, casing collar detectors, acoustic sensors, vibration sensors. Sensors to determine properties of the vehicle include accelerometers, gyroscopes, magnetometers, attitude sensors, gravity sensors, as well as sensors used for navigation such as casing collar locators, metal sensors, magnetometers, acoustic sonars, an imaging system, electromagnetic imaging systems, inductive measurements of conductive objects.

FIG. 1 depicts an example well 100 constructed in accordance with the concepts herein. The well 100 extends from the surface 106 through the Earth 108 to one or more subterranean zones of interest 110 (one shown). The well 100 enables access to the subterranean zones of interest 110 to allow recovery (that is, production) of fluids (e.g., crude oil, natural gas, other gases, brine, water, or any combinations of these) to the surface 106 and, in some implementations, additionally or alternatively allows fluids to be placed in subterranean zones of interest 110. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both. In some implementations, the well 100 includes a nearly vertical section extending from the surface 106 to near the reservoir depth, and the well 100 can slowly turn (e.g., 1 to 30 degrees per 100' of length) forming a heel of the well 100 until the well 100 becomes substantially horizontal at the depth of the reservoir. In some implementations, the well 100 proceeds substantially horizontally for distances from a few thousand feet to a few miles at the reservoir depth.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well need not produce only hydrocarbon liquid, and may incidentally or in smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with pipe, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

Positioned concentrically within the casing 112 is often a second run of pipe called the production tubing. The production tubing can convey produced fluids from the well 100 to the surface 106 and can protect the casing 112 from corrosion and scale build-up.

The wellhead provides pressure seals for the casing 112. The wellhead can provide seals and a location to hang production tubing within the casing 112. The wellhead defines an attachment point for other equipment to be attached to the well 100. For example, FIG. 1 shows well 100 with a Christmas tree 150 (also referred to as a tree 150) attached to the wellhead for flowing fluids into or out of the well 100. The tree 150 includes a wing valve 150a, a swab valve 150b, a master valve 150c, and a tree cap 150d. The wing valve 150a can be used to control flow of fluid into or out of the well 100. In some cases, the tree 150 includes two wing valves 150a, one for flowing fluid(s) into the well 100 and another for flowing fluid(s) out of the well 100. The swab valve 150b (also referred to as a crown valve) is located at the top of the tree 150 for providing vertical access into the well 100, for example, for a wireline or coiled tubing operation or for deploying an untethered downhole tool into the well 100. The swab valve 150b is capped on top by the tree cap 150d, which is removable for accessing the bore of the tree 150. The master valve 150c is an isolation valve which can completely shut off fluid flow into and out of the well 100. In some cases, the tree 150 includes two master valves 150c (such as an upper master valve and a lower master valve) to provide redundancy, thereby ensuring a backup is available to shut off the well 100 if one of the master valves fails for any reason.

Figure 3A:
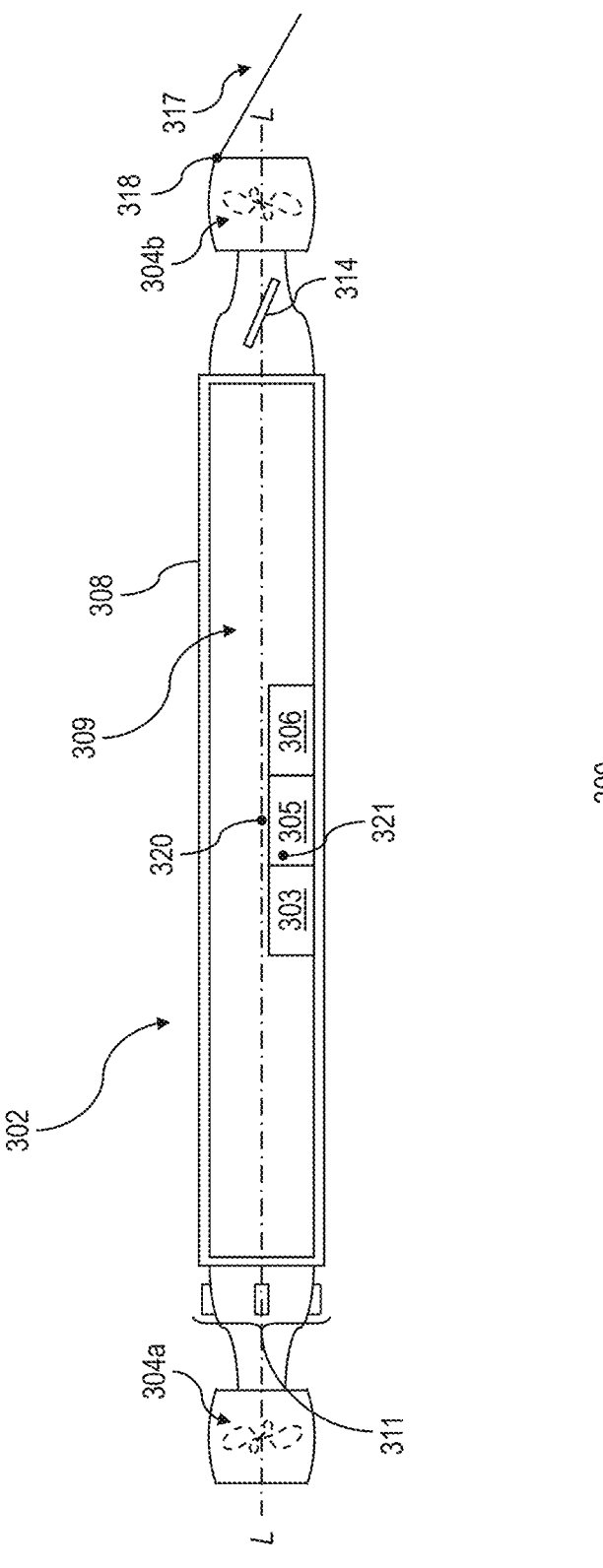
FIG. 3A is a side view of an example untethered downhole tool that can be deployed into the well of FIG. 1.
Figure 3B:
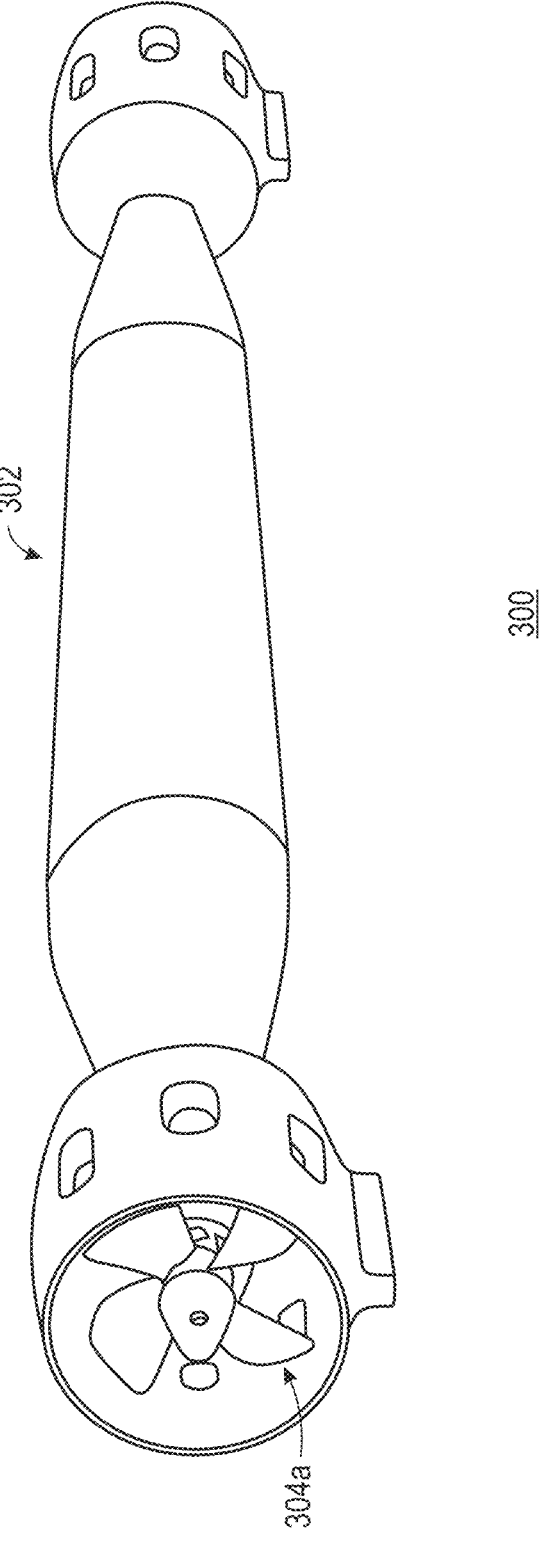
FIG. 3B is a perspective view of the example untethered downhole tool of FIG. 3A.

A wellhead attachment 200 is attached to the tree 150. The wellhead attachment 200 can be used to deploy untethered downhole tools, such as an untethered downhole tool 300. In FIG. 1, the untethered downhole tool 300 has been deployed by the wellhead attachment 200 and is descending downhole into the well 100. Examples of the wellhead attachment 200A and 200B are also shown in FIGS. 2A and 2B, respectively, and described in more detail later. An example of the untethered downhole tool 300 is also shown in FIGS. 3A and 3B and described in more detail later.

FIG. 2A is a schematic diagram showing side and perspective views of an example wellhead attachment 200A that can be used to deploy an untethered downhole logging tool or an autonomous downhole robot (ADR)/autonomous downhole vehicle (ADV) (such as the tool 300) that is untethered and used in downhole measurement/logging applications into a hydrocarbon well (such as the well 100). The ADR/ADR can be semi-autonomous, operate under supervised autonomy, automated, remotely operated, or autonomous. Conventional methods of inspecting and monitoring downhole conditions in hydrocarbon wells with lateral components are costly and require extensive surface equipment. Coiled tubing, tractors, and tethered (e.g., wireline, c-line, slick-line) tools are typically used. Such tethering equipment require auxiliary surface equipment, are difficult to mobilize, and require extensive crews. It can be desirable to utilize an untethered tool or ADR/ADV (such as the tool 300) for logging to eliminate the need for extensive surface equipment, large crews, and unnecessary downtime.

The wellhead attachment 200A is a topworks (or wellhead modification), which may be added to a well (such as the well 100) to enable simple deployment of an untethered tool or ADR/ADV (such as the tool 300), while maintaining the pressure barrier of protection between well contents and the environment. The wellhead attachment 200A (also referred to as topworks) includes a pipe 202, a mounting flange 204, and pressure seals 206a, 206b. In some implementations, the pipe 202 (also referred to as a launch chamber or housing) has a diameter that is approximately equal to the diameter of the vertical clearance through the wellhead of the well 100. For example, the pipe 202 can be sized such that its diameter is approximately equal to the diameter of the vertical clearance through the wellhead of the well 100. The pipe 202 has a longitudinal length that is equal to or greater than a longitudinal length of the untethered downhole tool (such as the tool 300) that is to be deployed into the well 100, such that the tool 300 can fit within the pipe 202 between the ends 202a, 202b of the pipe 202. For example, the pipe 202 can be sized such that its diameter and longitudinal length are sufficient for fitting the tool 300 within the pipe 202 between the ends 202a, 202b of the pipe 202. The mounting flange 204 (or other connector) is located at a lower end 203b of the wellhead attachment 200A. To install the wellhead attachment 200A, the tree cap (or optionally the tree cap assembly including both the cap and the fitting which the cap screws onto) of the well 100 may be removed, and the wellhead attachment 200A can be attached to the top of the well 100. In some implementations, as shown in FIG. 2A, the valve 208 is installed at the lower end 202b of the pipe 202. For example, the valve 208 is located between the mounting flange 204 and the lower end 202b of the pipe 202. The valve 208 can be, for example, a gate valve, a ball valve, or another type of valve that, when open, allows an untethered downhole tool to pass through the open valve. The valve 208 can be manually operated or actuated pneumatically, electrically, hydraulically, or any combinations of these.

Fluid can be added into the pipe 202, the well 100, or both to dampen impact forces on the tool 300 during deployment. The wellhead attachment 200A can include a pressure relief valve 210 installed at the upper end 202a of the pipe 202. For example, the upper end 202a of the pipe 202 can be flanged and coupled to a blind that includes the pressure relief valve 210, as shown in FIG. 2A. The pressure relief valve 210 is a safety valve that can be used to control or limit pressure in the wellhead attachment 200A. The pressure relief valve 210 can be configured to open at a predetermined pressure or temperature. Pressure can be relieved from the wellhead attachment 200A by allowing pressurized fluid to flow from an auxiliary passage out of the wellhead attachment 200A through the pressure relief valve 210. Relieving pressure through the pressure relief valve 210 can prevent damage to the wellhead attachment 200A. The pressure relief valve 210 serves as a layer of protection against uncontrolled release of fluid from the wellhead attachment 200A and allows for safe operations.

Pressure seals 206a, 206b are installed at the flanged ends 202a, 202b of the pipe 202, respectively. For example, as shown in FIG. 2A, the pressure seal 206a is installed at the upper end 202*a* of the pipe 202, between the pipe 202 and the pressure relief valve 210. The pressure seal 206*a* is configured to seal the connection between the pipe 202 and the pressure relief valve 210, such that fluid is prevented from leaking out of the connection. For example, as shown in FIG. 2A, the pressure seal 206*b* is installed at the lower end 202*b* of the pipe 202, between the pipe 202 and the valve 208. The pressure seal 206*b* is configured to seal the connection between the pipe 202 and the valve 208, such that fluid is prevented from leaking out of the connection.

FIG. 2B is a schematic diagram showing side and perspective views of an example wellhead attachment 200B that can be used to deploy an untethered downhole logging tool or an autonomous downhole robot (ADR)/autonomous downhole vehicle (ADV) (such as the tool 300) that is untethered and used in downhole measurement/logging applications into an oil well (such as the well 100). The wellhead attachment 200B shown in FIG. 2B is substantially similar to the wellhead attachment 200A shown in FIG. 2A. For example, the wellhead attachment 200B includes all of the components of the wellhead attachment 200A. In contrast to the wellhead attachment 200A shown in FIG. 2A, the wellhead attachment 200B includes an additional valve 212 and an additional pressure seal 206*c*. The valve 212 can be, for example, a gas bleed valve or a gas vent valve. The valve 212 is installed between the pressure relief valve 210 and the upper end 202*a* of the pipe 202. The pressure seal 206*a* is installed between the pressure relief valve 210 and the valve 212, and the pressure seal 206*b* is installed between the valve 212 and the upper end 202*a* of the pipe 202. The pressure seal 206*c* is installed between the lower end 202*b* of the pipe 202 and the valve 208.

FIGS. 3A and 3B show side and perspective views, respectively, of an example untethered downhole tool 300 that can be deployed into a well (such as the well 100). Energy efficient motion may be provided by a substantially neutrally buoyant autonomous downhole robot (ADR), autonomous downhole vehicle (ADV), or untethered downhole vehicle (UDV) results in low-energy requirements and in-turn allows long vehicle distance traversal from batteries and motion at higher speeds than is achieved by wheeled or tracked downhole vehicles. In some implementations, the tool 300 is semi-autonomous, autonomous, operated under supervised autonomy, remotely operated, or automated. The tool 300 is substantially neutrally buoyant. In some implementations, the tool 300 has a buoyancy that is within +/−10% of neutral buoyancy in its surrounding fluid. In some cases, the buoyancy of the tool 300 can be adjusted based on the fluids present within the well 100 into which the tool 300 is to be deployed. Another way to maintain neutral buoyancy of the tool 300 is to overcome frictional forces by maintaining frictional forces to be less than ten times the propulsion force of the tool 300 as the tool 300 travels in the well 100.

The tool 300 includes a housing 302 and propellers 304*a*, 304*b*. The housing 302 protects the inner components of the tool 300 from the downhole fluids, which may be conductive, corrosive, or otherwise damaging or incompatible with certain components of the tool 300. The housing 302 provides additional buoyancy to make the tool 300 substantially neutrally buoyant. In some implementations, the housing 302 contributes sufficient buoyancy to give the tool 300 a density that is within +/−20% of the density of the surrounding fluid. In some implementations, the housing 302 provides additional buoyancy by enclosing an internal air-filled or gas-filled volume 309. In some implementations, the enclosed volume 309 is surrounded by a pressure housing 308 which maintains the internal volume at a lower pressure than the downhole pressure in the wellbore. In some implementations, the housing 302 provides additional buoyancy by incorporating a low-density, pressure-resistant material, such as a syntactic foam. In some implementations, the low-density, pressure-resistant material has a density less than about 0.8 grams per cubic centimeter (g/cc) and maintains its low density at pressures exceeding 3,000 psi (20, 684 kilopascals (kPa)) and temperatures exceeding 90 degrees Celsius.

In some implementations, the buoyancy of the tool 300 can be adjusted to better match the density of the fluids present around the tool 300 within the well 100 into which the tool 300 is to be deployed. In some implementations, the buoyancy of the tool 300 is increased by discharging a heavy fluid from a storage bag at ambient (surrounding) pressure by a pump, where the storage bag is attached to the housing 302 and is made of a flexible material which maintains its strength and is not deteriorated by downhole fluids. In some implementations, the storage bag is filled with a fluid which is lighter than the downhole fluids and discharged to reduce the buoyancy of the tool 300. In some implementations, the buoyancy of the tool 300 is increased by releasing a weight heavier than the downhole fluids from attachment to the housing 302. In some implementations, the buoyancy of the tool 300 is decreased by releasing a float that is lighter than the downhole fluids from attachment to the housing 302.

In general, it may be difficult to perfectly match the density of the tool 300 to the surrounding fluid density, so the tool 300 can be designed to be substantially neutrally buoyant, for example, having a density within +/−20% of the fluid density. The mismatch in density may cause the tool 300 to either float upward or sink downward in the well 100.

In some implementations, the tool 300 includes a passive mechanical centralization element. In some implementations, the tool 300 includes an active centralization element, such as a pump that is configured to adjust ballast and trim as the tool 300 travels in the well 100. In some implementations, the active centralization element includes a sliding mass housed within the housing 302 that allows the tool 300 to correct its pitch. In some implementations, the active centralization element includes a tank holding liquids, and a pump that moves liquids from one area of the tank to another or from the tank to another tank to distribute weight. In some implementations, the tool 300 includes centralizers 311 distributed around a circumference of the tool 300 which can prevent the housing 302 from coming into contact with a wall of the well 100 (e.g., the casing 112). In some implementations, the centralizers 311 are connected to the housing 302, project outward from the housing 302, and provide a low-friction contact with the wellbore and hold the main body of the tool 300 away from the wellbore wall. In some implementations, the centralizers 311 include at least three rigid fins that are distributed around the circumference of the tool 300, rigidly attached to the housing 302, and short enough to allow the tool 300 to be able to pass through the wellbore. In some implementations, the centralizers 311 include springs that are distributed around the circumference of the tool 300, having a maximum extent that allows the tool 300 to pass through the wellbore, and exert a force against the wellbore wall, which increases as the spring is compressed to smaller than its maximum extent. In some implementations, a location where the centralizer 311 contacts the wellbore is protected by a pad made of a low-friction material, such as Teflon. In some implementations, the location where the centralizer 311 contacts the wellbore is fitted with a wheel to reduce friction between the tool 300 and the wellbore as the tool 300 travels in the well 100.

The tool 300 includes at least one propeller 304a. For example, as shown in FIG. 3A, the tool 300 includes two propellers 304a, 304b. In some implementations, as shown in FIG. 3A, the propellers 304a, 304b are located at opposite ends of the housing 302. The housing 302 can house control electronics 303 and a power supply 305 (such as a battery). The housing 302 is made of a material that can withstand downhole conditions (e.g., downhole temperature and pressure). In some implementations, the housing 302 is made of aluminum that is anodized or plated to resist corrosion, steel, or other metal, such as Inconel, that is selected to resist downhole chemicals and conditions. In some implementations, the housing 302 is coated with a hydrophobic coating, which can minimize drag for facilitating travel in the well 100. In some implementations, the housing 302 is solid, with no internal gas-filled void, but may obtain the necessary buoyancy by incorporating solid materials which are substantially lighter than the downhole fluids, such as syntactic foam.

The tool 300 can include sensors 306 that measure properties of the wellbore fluids, properties of the wellbore wall, tubing, or casing of the wellbore, properties of the rock formations beyond the wellbore, properties of the tool 300 (e.g., location, attitude, velocities, rotation rates, linear accelerations, and/or angular accelerations), or any combinations of these. In some implementations, the sensors 306 include a pressure sensor and/or a temperature sensor used for detecting leaks in the well casing 112 and inferring inflow. As another example, the sensors 306 can include a density sensor, a viscosity sensor, a chemical composition sensor, or any combinations of these to infer the physical or chemical properties of downhole fluids. As another example, the sensors 306 can include sensors for measuring erosion of pitting of the tubing or casing 112 produced by corrosion or sensors for measuring the accumulation of scale on the inside surface of the pipe. As another example, the sensors 306 can include sensors for listening and recording the sounds produced by inflow into the well or by flow behind casing indicating a failure in the cement sheath behind the casing 112. The sensors 306 can include a resistivity sensor that measures subsurface electrical resistivity. As another example, the sensors 306 can include a borehole imaging system that produces and stores images (e.g., optical imaging, acoustic imaging, electrical image, or any combinations of these) of the casing 112, tubing, or borehole wall of the well 100. As another example, the sensors 306 can include a sonic logging system that provides a formation interval transit time that can be correlated to lithology, rock texture, and porosity. As another example, the sensors 306 may include actuators which dispense chemical treatments to inhibit scale or corrosion, optionally selecting the locations to dispense the chemicals based on measured amounts of corrosion or scale buildup. As another example, the sensors 306 may include actuators for switching downhole control valves or removing debris, such as sand, from the wellbore.

The power supply 305 provides power to components of the tool 300, such as the propellers 304a, 304b, control electronics 303, and sensors 306 that may require power to operate. When the tool 300 operates in a liquid or fluid mixture and is driven by the propellers 304a, 304b rotating around a longitudinal axis of the tool 300, the propellers 304a, 304b generate thrust in the direction along the longitudinal axis (L) and generate a torque around the longitudinal axis of the tool. If this torque is unbalanced, it can cause undesirable roll, which is an undesired rotation of the tool 300 around its longitudinal axis. In some implementations, this torque is compensated by distributing the mass of the tool 300 such that the center of mass 321 of the tool 300 is below the longitudinal axis L of the tool 300 with respect to gravity. For example, batteries (e.g., power supply 305) and heavy motor components of the tool 300 can be positioned such that they are below the longitudinal axis of the tool 300 with respect to gravity when the tool 300 is oriented horizontally. This configuration can produce a non-zero vertical separation between the center of buoyancy 320 at the geometrical center of the tool 300, and the center of mass 321 is shown below the axis of the tool 300 (having a vertical separation from the center of buoyancy 320) to reflect the heavier tool components: electronics 303, power supply 305, and sensors 306 being located below the axis L. The center of mass 321 is shown with a small horizontal displacement from the center of buoyancy 320, reflecting a case where the left half of the tool 300 is slightly heavier than the right half of the tool 300. The vertical separation between the center of buoyancy 320 and the center of mass 321 introduces a righting moment that works to offset the torque produced by the propellers 304a, 304b when the tool 300 is horizontal but becomes smaller, decreasing to zero as the orientation of the tool 300 approaches a vertical orientation. Note that there is no separation between the center of buoyancy 320 and the center of mass 321 that can apply a torque around the axis L of the tool 300 to prevent the tool 300 from rotating when the tool 300 is in the vertical orientation.

In some implementations, as shown in FIGS. 3A and 3B, the tool 300 has an even number (for example, two) of counter-rotating co-axial propellers 304a, 304b. The axis of rotation of the propeller 304a and the axis of rotation of the propeller 304b are coaxial and aligned with the longitudinal axis (L) defined by housing 302 of the tool 300. The propellers 304a, 304b counter-rotate (i.e., rotate in opposite directions). For example, the propeller 304a rotates in a clockwise direction, and the propeller 304b rotates in a counter-clockwise direction. As another example, the propeller 304a rotates in a counter-clockwise direction, and the propeller 304b rotates in a clockwise direction. Each of the propellers 304a, 304b includes propeller blades that can be rotated to produce thrust. The propellers 304a, 304b are coaxial (for example, aligned along the longitudinal axis of the tool 300) and can be configured to counter-rotate, such that the torque from the propellers 304a, 304b around the longitudinal axis of the tool 300 is substantially cancelled. This counter-rotation of the propellers 304a, 304b can prevent a net torque around the longitudinal axis of the tool 300, which could otherwise cause the tool 300 to roll. In some implementations, the propellers 304a, 304b are on a streamlined downhole robot shell (such as the housing 302) and are placed on opposite ends of the tool 300 and centered on the longitudinal axis of the tool (axially positioned propellers). In some implementations, there is a direct drive of the propellers 304a, 304b which are mechanically coupled together such that one turns while the other turns in an opposite direction. This propulsion unit consists of two axially aligned propellers 304a, 304b that exhibit synchronized, yet opposing rotation and have opposite pitch on the propeller blades such that opposing rotation generates thrust in the same direction.

In some implementations, one of the propellers 304a, 304b is the primary propeller that is set in motion by a rotating shaft, while the other of the propellers 304a, 304b is the secondary propeller that derives its power from the interplay of gear teeth located on the hubs of propellers 304a, 304b. This interconnection can include one or more gears engaged with the propellers 304a, 304b such that the rotation of one of the propellers 304a, 304b is transmitted to the other propeller, but reversed in direction. This configuration works to reduce fluid swirling, for example, at the outlet of the propulsion unit, thereby reducing energy being lost to turbulence. In some implementations, the counter-rotating propellers 304a, 304b are placed at opposite ends of the tool 300 such that thrust is applied at both ends, making both forward and reverse motions stable. In some implementations, the counter-rotating propellers 304a, 304b are operated at different speeds to purposefully produce a torque imbalance to adjust the roll of the tool 300 as it travels in the well 100. In some implementations, the propellers 304a, 304b include blades that are adjustable, such that the pitch angles of the blades of the propellers 304a, 304b can be adjusted. For example, the blades of the propellers 304a, 304b can be motorized, such that the pitch angles of the propellers 304a, 304b can be adjusted. In some implementations, the propellers 304a, 304b are asymmetrically bladed (for example, have blades of different sizes or shapes). In some implementations, the propellers 304a, 304b are symmetrically bladed and have an odd number of blades. The speeds at which the propellers 304a, 304b are counter-rotated can be modulated based on the density of the stratified fluid within the well 100 to generate a thrust vector across the longitudinal axis of the tool 300.

In some implementations, the untethered downhole tool 300 addresses the problem of propeller torque by including counter-rotating propellers. The propellers 304a, 304b can be paired propellers which rotate in opposite directions and have their propeller blades pitched in opposite directions such that counter-rotation produces thrust in the same direction from each of the propellers 304a, 304b. In some implementations, the counter-rotating propellers 304a, 304b are located at opposite ends of the untethered downhole tool 300. In some implementations, the propellers 304a, 304b are coupled via a direct drive in which one of the propellers drives rotation of the other propeller. In some implementations, the propellers 304a, 304b are separately controlled, for example, by each being driven by its own independent motor. In some implementations, the propellers 304a, 304b rotate at the same speed with their rotation axes along the longitudinal axis L of the tool 300, but in opposite directions such that the torques each propeller produces around its axis of rotation are equal and opposite and there is no net torque produced around the axis L, and the propeller motion does not cause the tool 300 to roll. In some implementations, one or more of the propellers are asymmetrically bladed, for example, having different size blades or blades which are not uniformly distributed in angle around the propeller shaft. In some implementations, one or more of the propellers are symmetrically bladed with an odd number of blades.

In some implementations, the tool 300 includes a roll sensor 312 which measures the angle of rotation of the tool 300 around its longitudinal axis L relative to a reference direction, where the reference direction may be defined by the direction of gravity (e.g., down) or by the location of an object external to the tool 300 such as a feature of the wellbore or casing 112 or by the angle of rotation of the tool 300 at some earlier point in time, where the sensor measures changes in rotation, as with a gyroscope. In some implementations, the roll of the tool 300 is measured, and the difference in rotation speed between the counter-rotating propellers 304a, 304b is adjusted to prevent the tool 300 from rolling while the tool 300 moves forward along its longitudinal axis L. In some implementations, the rotation speeds or difference in rotation speed between the two counter-rotating propellers 304a, 304b is adjusted to cause the tool 300 to roll into a desired orientation or at a desired rotation rate.

The tool 300 includes at least one sensor 306. In some implementations, the sensor 306 projects through the housing 302 of the tool 300, contacts the downhole fluids at a point near the circumference of the tool 300, and is most sensitive to the properties the sensor 306 measures near or at the point of contact. In some implementations, the sensor 306 is positioned within the housing 302 but is most sensitive to the downhole fluid, well, wellbore, or rock properties that the sensor 306 measures in a particular direction from the sensor 306. In some implementations, the rotation speeds of the two propellers 304a, 304b are adjusted to roll the tool 300 such that the sensor 306 is positioned at a desired first measurement location. In some implementations, the rotation speeds of the two propellers 304a, 304b are adjusted to roll the tool 300 such that the sensor 306 is positioned at a desired second measurement location having a different angular location around the axis of the wellbore from the desired first measurement location.

In some implementations, roll of the tool 300 is controlled to steer the tool 300 by orienting a fixed force which is perpendicular to the axis L in a desired steering direction. In some implementations, the fixed force is generated by a stationary control surface 314 external to the tool 300 and positioned at a non-zero angle with respect to the axis L such that fluid flow around the tool 300 acts on the control surface 314 to turn the tool 300. As shown in FIG. 3A, the control surface 314 can include a fin which is slanted downward to the right relative to the axis L and applies a force directing the tool 300 downward as the tool 300 travels to the right. In some implementations, the fixed force is generated by a displacement between the center of mass 321 and the center of buoyancy 320, where a component of the displacement is perpendicular to the axis of gravity. For example, if the axis L is vertical (as when ascending or descending a vertical well) and there is a horizontal displacement between the center of mass 321 and the center of buoyancy 320, this will produce a torque that acts to change the heading of the tool 300 (e.g., to change the pitch or yaw of the tool 300). As shown in FIG. 3A, the center of mass 321 is slightly to the left of the center of buoyancy 320, which can exert a torque causing the left end of the tool 300 to turn downward. With such a fixed force in place, the roll of the tool 300 can be adjusted by changing propeller speeds to steer the direction of the vehicle heading.

In some implementations, the control surface 314 is oriented to steer the tool 300 in one direction and a center-of-mass/center-of-gravity displacement is oriented to steer the tool 300 in an opposite direction. The size and inclination of the control surface 314 can be selected such that the torque produced acting to change the pitch and yaw of the tool 300 at a desired cruising speed cancels the force acting to change the pitch and yaw of the tool 300 from a center-of-mass/center-of-gravity separation for both horizontal and vertical vehicle orientations. This balancing of a speed-dependent force with a constant force at the vehicle cruising speed allows the tool 300 to travel in a straight line at its cruising speed. To turn, the tool 300 can change its speed so that one of the forces dominates and adjusts its role so that the dominant force acts to turn the axis L of the tool 300 in the desired direction.

In some implementations, the tool 300 steers by orienting the fixed force to the desired roll angle and holding the fixed force at that angle until the steering is complete. For straight travel, the tool 300 can continuously roll so that the fixed force is not oriented in a single direction long enough for significant motion to occur in that direction, similar to how a spiral on an American football keeps the football moving in a straight path.

In some implementations, the tool 300 includes an entry guide 317. In some implementations, the roll of the tool 300 is adjusted to position the tip of the entry guide 317 in front of a hole (such as an open mouth of a pipe), the tool 300 applies forward thrust along its axis L, and the entry guide 317 directs the tool 300 into the hole. This configuration enables the tool 300 to enter a hole which may not be aligned with the axis L of the tool 300. In some implementations, the entry guide 317 is a strip of metal or plastic that is longer than it is wide, attached to a point 318 on the circumference of the tool 300 near the front of the tool 300, where "front" refers to whichever end of the tool 300 is in the direction of travel with the understanding that the tool 300 has the ability to travel in both directions such that "front" will apply to different ends of the tool 300 depending on whether the tool 300 is ascending or descending in the well 100. In some implementations, the entry guide 317 extends ahead of the tool 300 and across its diameter, crossing at its midpoint the centerline of the tool 300, such that the tip of the entry guide 317 is ahead of (in front of) the tool 300 and to one side of the axis L of the tool 300. The rotation rate of a propeller (304a or 304b) can be adjusted to bring the tool 300 to a roll angle where the tip of the entry guide 317 is aligned with a hole which the tool 300 is to enter. As the tool 300 proceeds forward, the entry guide 317 can direct the front of the tool 300 into the hole. Depending on the size and position of the wellbore and the hole, a shorter entry guide 317 (which crosses the centerline of the tool 300 closer to its tip than to its attachment) may be sufficient.

FIG. 4 is a flow chart of an example method 400 for deploying an untethered downhole tool (such as the tool 300) into a well (such as the well 100). The wellhead attachment 200A or 200B can, for example, be used to implement the method 400. At block 402, the tool 300 is placed within a housing (such as the housing 302) of a wellhead attachment (such as the wellhead attachment 200A or 200B). As described previously, both wellhead attachments 200A and 200B include the gate valve 208.

After placing the tool 300 within the housing 302 at block 402, the gate valve 208 is closed at block 404. At block 406, a master valve (such as the master valve 150c), a wing valve (such as the wing valve 150a), and a swab valve (such as the swab valve 150b) of a tree (such as the tree 150) of the well 100 are closed. In cases where the tree 150 includes multiple master valves 150c, some or all of the master valves 150c can be closed at block 406. In such cases where some or all of the master valves 150c are closed at block 406, the swab valve 150b may remain open at block 406. In cases where there is only one master valve 150c that is closed, the swab valve 150b remains closed at block 406. Closing the valves 150a, 150b, 150c at block 406 isolates the tree 150 from the well 100, such that fluid is prevented from flowing between the well 100 and the tree 150.

After closing the valves 150a, 150b, and 150c at block 406, gas is vented from a tree cap (such as the tree cap 150d of the tree 150) at block 408. Gas can be vented from the tree cap 150d of the tree 150 at block 408, for example, by a gas vent/bleed valve of the tree cap 150d. After venting gas from the tree cap 150d at block 408, the tree cap 150d is removed from the tree 150 at block 410. At block 412, the wellhead attachment 200A or 200B is installed to the tree 150, thereby replacing the tree cap 150d that was removed at block 410.

Installing the wellhead attachment 200A or 200B to the tree 150 at block 412 can include lifting the wellhead attachment 200A or 200B (which includes the tool 300 positioned within the housing 302) above the tree 150, for example, by a crane. Installing the wellhead attachment 200A or 200B to the tree 150 at block 412 can include installing a gasket (such as an implementation of the pressure seal 206a) on the tree 150 where the tree cap 150d was removed. Installing the wellhead attachment 200A or 200B to the tree 150 at block 412 can include coupling the mounting flange 204 to the tree 150 after the gasket is installed.

After installing the wellhead attachment 200A or 200B to the tree 150 at block 412, the swab valve 150b of the tree 150 is opened at block 414. In some implementations, after installing the wellhead attachment 200A or 200B to the tree 150 at block 412 and before opening the swab valve 150b at block 414, the method 400 includes pressure testing the installed wellhead attachment 200A or 200B to verify absence of fluid leakage from between the tree 150 and the installed wellhead attachment 200A or 200B.

After opening the swab valve 150b at block 414, the gate valve 208 (that was closed at block 404) is opened at block 416, thereby allowing the tool 300 (that was placed within the housing at block 402) to descend from the housing 302 into the tree 150 below the opened swab valve 150b with respect to gravity. After the tool 300 has descended into the tree 150 at block 416, the gate valve 208 and the swab valve 150b are closed at block 418. Closing the gate valve 208 and the swab valve 150b at block 418 isolates the tool 300 from the tree 150, such that fluid is prevented from flowing between the tool 300 and the tree 150.

After closing the gate valve 208 and the swab valve 150b at block 418, the master valve 150c is opened at block 420, thereby allowing the tool 300 to descend into the well 100, so that the tool 300 can begin to perform logging operations, treatment operations, intervention operations, or any combinations of these. In some implementations, after opening the master valve 150c at block 420, the method 400 includes opening the wing valve 150a to allow fluid flow through the tree 150 into the well 100. Flowing fluid into the well 100 through the open wing valve 150a can facilitate travel of the tool 300 further into the well 100.

FIG. 5 is a flow chart of an example method 500 for retrieving an untethered downhole tool (such as the tool 300) from a well (such as the well 100). The method 500 can be implemented, for example, after implementing method 400. The method 500 can be implemented, for example, to return the tool 300 to its initial position (before deployment) within the wellhead attachment head 200A or 200B. At the beginning of method 500, the tool 300 is already disposed within the well 100, has performed downhole operations (for example, logging operations, treatment operations, intervention operations, or any combinations of these), and is ready for retrieval from the well 100. At the beginning of method 500, the wellhead attachment 200A or 200B is already installed on the tree 150, and the gate valve 208 is open, so that the installed wellhead attachment 200A or 200B is ready for retrieving the tool 300. At block 502, a wing valve (such as the wing valve 150a) of a tree (such as the tree 150) of the well 100 is opened, thereby allowing flow of fluid out of the well 100 through the open wing valve 150a and directing the tool 300 into the tree 150.

Once the tool 300 has traveled into the tree 150, a master valve (such as the master valve 150c) of the tree 150 is closed at block 504, thereby trapping the tool 300 within the tree 150 and stopping flow of fluid out of the well 100.

Closing the master valve 150c at block 504 isolates the tree 150 from the well 100, such that fluid is prevented from flowing between the tree 150 and the well 100. In cases where the tree 150 includes multiple master valves 150c, some or all of the master valves 150c can be closed at block 504.

After closing the master valve 150c at block 504, the wing valve 150a is closed at block 506 to prevent fluid from flowing out of the tree 150 through the wing valve 150a. At block 508, a fluid that is denser than the tool 300 is flowed into the tree 150, thereby causing the tool 300 to float out of the tree 150 and into the wellhead attachment 200A or 200B (already installed on the tree 150). In some implementations, the fluid that is flowed into the tree 150 at block 508 includes water, a hydrocarbon, or both.

Figure 6:
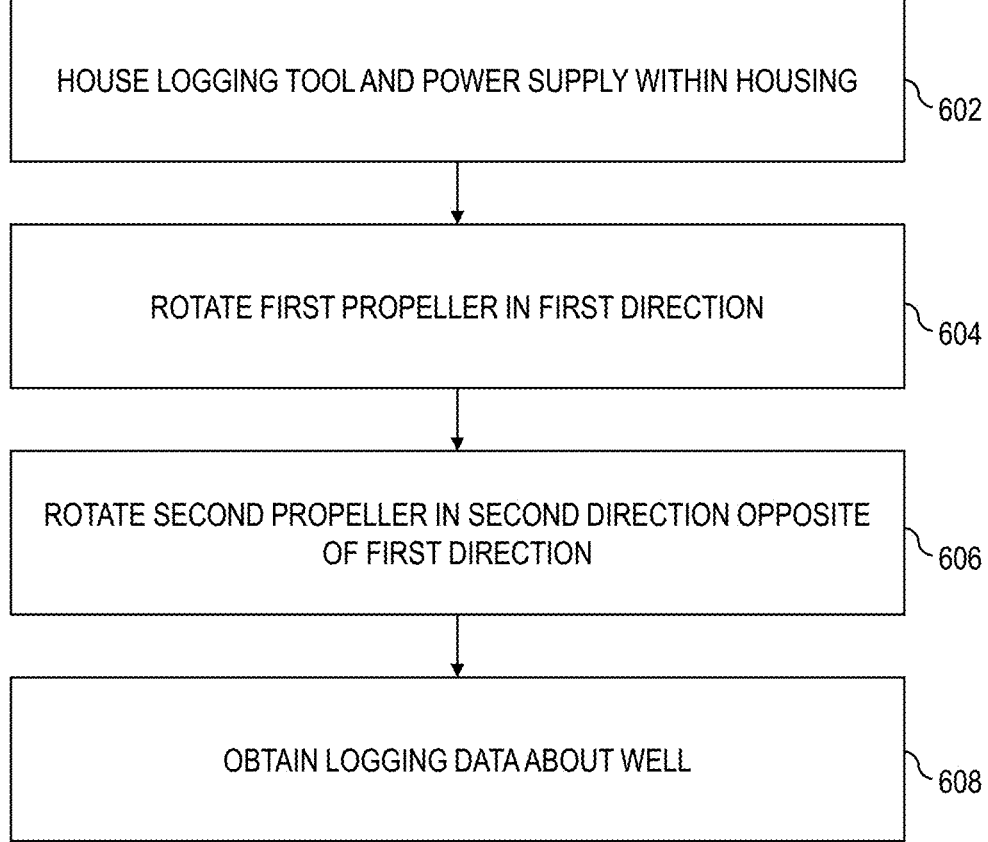
FIG. 6 is a flow chart of an example method for an untethered downhole well operation in the well 100 of FIG. 1.

As described previously, both the wellhead attachments 200A and 200B include the gate valve 208. Once the tool 300 has traveled into the wellhead attachment 200A or 200B, the gate valve 208 (of the installed wellhead attachment 200A or 200B) is closed at block 510, thereby trapping the tool 300 within the installed wellhead attachment 200A or 200B. After closing the gate valve 208 at block 510, the wellhead attachment 200A or 200B (with the tool 300 positioned within the wellhead attachment 200A or 200B) is removed from the tree 150 at block 512. Once the wellhead attachment 200A or 200B has been removed from the tree 150 at block 512, the tree cap 150d can be reinstalled to the tree 150 where the wellhead attachment 200A or 200B was removed, and the valves 150a, 150b, 150c of the tree 150 can be adjusted (closed/opened) to continue other well operations. The tool 300 can be retrieved from the wellhead attachment 200A or 200B that has been removed from the tree 150 at block 512. In cases where the tool 300 performed logging operations in the well 100, the logging data stored in the tool 300 can be retrieved from the tool 300. FIG. 6 is a flow chart of an example method 600 for an untethered downhole well operation, for example, in the well 100. The tool 300 can, for example, perform the method 600. At the beginning of method 600, the tool 300 is already been deployed in the well 100 and is submerged in well fluid within the well 100. At block 602, while submerged in well fluid within the well 100, a measurement system (such as the system 303) and a power supply (such as the power supply 305) are housed within a housing (such as the housing 302) that defines a longitudinal axis (such as the longitudinal axis L).

At block 604, a first propeller (such as the propeller 304a) is rotated in a first direction. While rotating the first propeller 304a in the first direction at block 604, a second propeller (such as the propeller 304b) is rotated at block 606 in a second direction that is opposite the first direction. For example, the first direction in which the first propeller 304a is rotated at block 604 is clockwise, and the second direction in which the second propeller 304b is rotated at block 606 is counter-clockwise. As another example, the first direction in which the first propeller 304a is rotated at block 604 is counter-clockwise, and the second direction in which the second propeller 304b is rotated at block 606 is clockwise.

Rotating the first propeller 304a in the first direction at block 604 and rotating the second propeller 304b in the second direction at block 606 produces thrust for moving the tool 300 within the well 100. In some implementations, the second propeller 304b is coupled to the first propeller 304a via a direct drive, and rotation of the first propeller 304a at block 604 drives rotation of the second propeller 304b at block 606. In some cases, the first propeller 304a and the second propeller 304b are rotated in the first direction and the second direction at blocks 604 and 606, respectively, at different speeds. Rotating the first propeller 304a and the second propeller 304b at different speeds can be useful, for example, in cases where it is desired to orient the tool 300 to a certain roll angle or to cause it to roll at a certain rate. In some implementations, the method 600 includes adjusting the rotating speed of the first propeller 304a, the second propeller 304b, or both. In some implementations, the method 600 includes adjusting a pitch angle of the first propeller 304a, the second propeller 304b, or both.

While rotating the first propeller 304a in the first direction at block 604 and rotating the second propeller 304b in the second direction at block 606, the tool 303 obtains logging data about the well 100 as the tool 300 moves within the well 100.

Figure 7A:
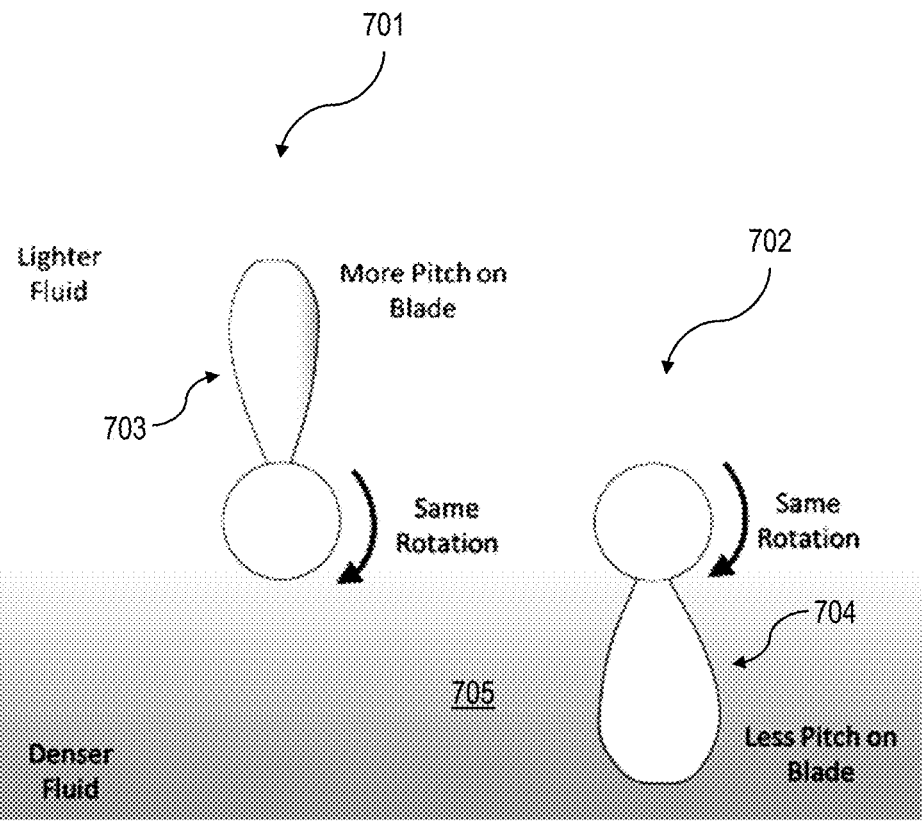
FIG. 7A is a schematic diagram demonstrating generation of constant propeller thrust in a density stratified medium using an example adjustable pitch propeller.

FIG. 7A is a schematic diagram demonstrating generation of constant propeller thrust in a density stratified medium using an example adjustable pitch propeller. FIG. 7A shows two views (701 and 702) of a one-bladed propeller viewed from the rear as the vehicle is moving into the page in a stratified medium 705, where the fluid near the top of the propeller has a lower density than the fluid near the bottom of the propeller. Note that this propeller is both asymmetrically bladed and has an odd number of blades. In view 701, the propeller blade 703 is in a less dense portion of the medium 705, the pitch or angle of attack of the propeller is larger so that the blade 703 appears thinner when viewed from behind. In view 702, the propeller blade 704 is in a more dense portion of the medium 705, the pitch or angle of attack of the propeller blade 704 is smaller so that the blade appears wider when viewed from behind.

Figure 7B:
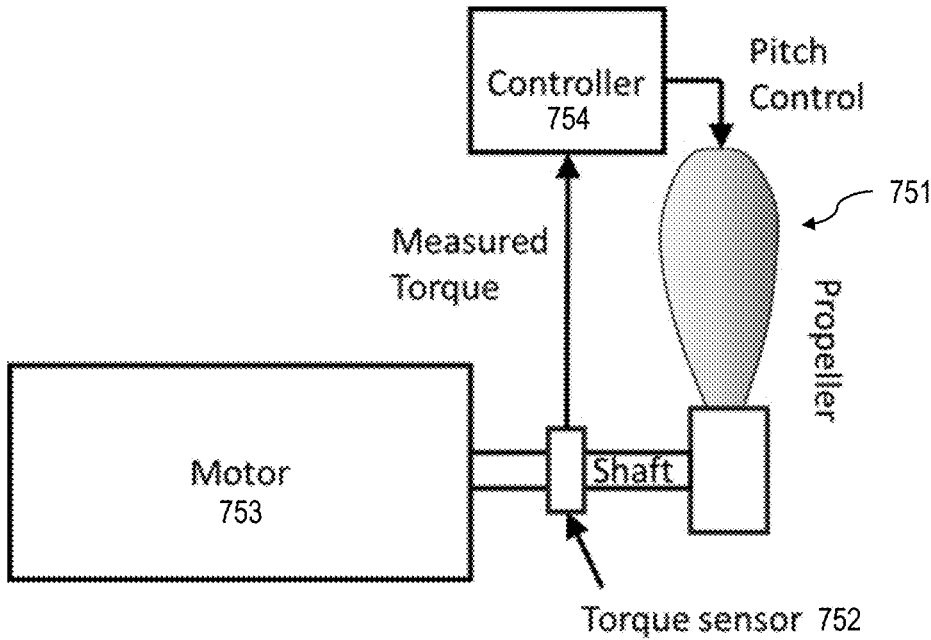
FIG. 7B is a schematic diagram of an example control system for adjusting propeller pitch to maintain constant thrust at all propeller angles.

FIG. 7B is a schematic diagram of an example control system 750 for adjusting propeller pitch to maintain constant thrust at all propeller angles. The control system 750 adjusts the pitch of the propeller blade 751 multiple times during each rotation to generate a thrust vector along the longitudinal axis of the untethered downhole tool. This modulation of pitch angle aligns the thrust vector with the vehicle axis regardless of density stratification in the fluid. In some implementations, a torque sensor 752 measures the instantaneous torque applied by the motor 753 to the propeller blade 751. The controller 754 adjusts the pitch of the propeller blade 751 to keep that torque constant for all propeller blade angles. In this way, the instantaneous thrust provided by the propeller is the same for all blade angles, regardless of the density of the medium around the propeller. In some implementations, the pitch angle at each rotation angle is selected to keep the instantaneous power being delivered to the propeller the same for all angles of rotation in the case where the motor is being driven by three sinusoidal phases 120 degrees apart, as would be the case for a brushless motor driven by the method of field-oriented control (FOC). The pitch angle can also be adjusted to generate greater thrust on one side of the vehicle as a means to steer the vehicle without changing the axis of the propeller, i.e. without the additional mechanical complexity of having to pivot the propeller or having multiple off-axis propellers.

Figure 8A:
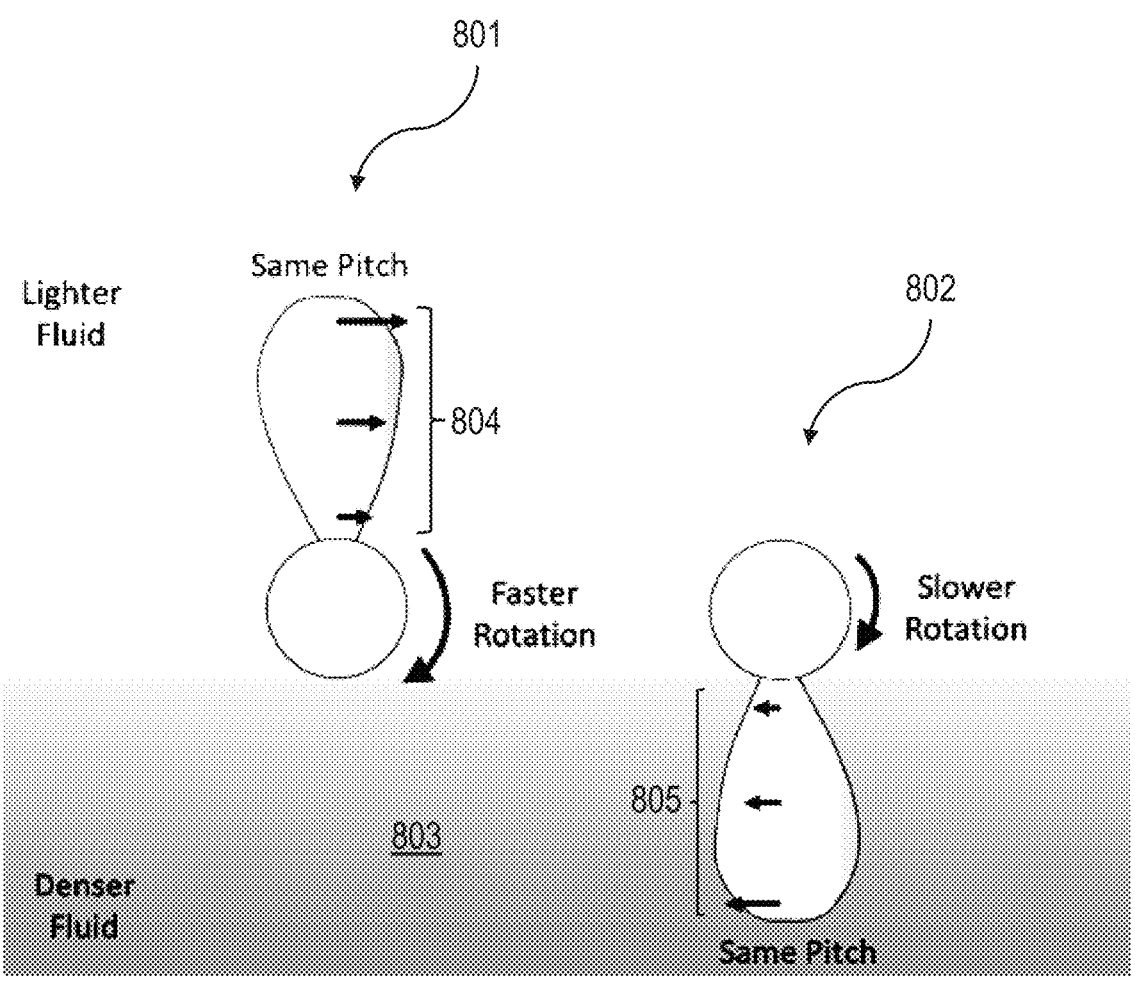
FIG. 8A is a schematic diagram demonstrating generation of constant propeller thrust in a density stratified medium using an example variable speed propeller.

FIG. 8A is a schematic diagram demonstrating generation of constant propeller thrust in a density stratified medium using an example variable speed propeller. FIG. 8A shows two views (801 and 802) of a single bladed propeller as seen from the back (vehicle moving away from the viewer) in a stratified medium 803 which is denser at the bottom of the figure than at the top of the figure. In view 801 the propeller blade is in a lighter fluid and is rotating at a faster rate as indicated by the large arrows 804. In view 802 the propeller is in a denser fluid and is rotating at a slower rate as indicated by the small arrows 805.

Figure 8B:
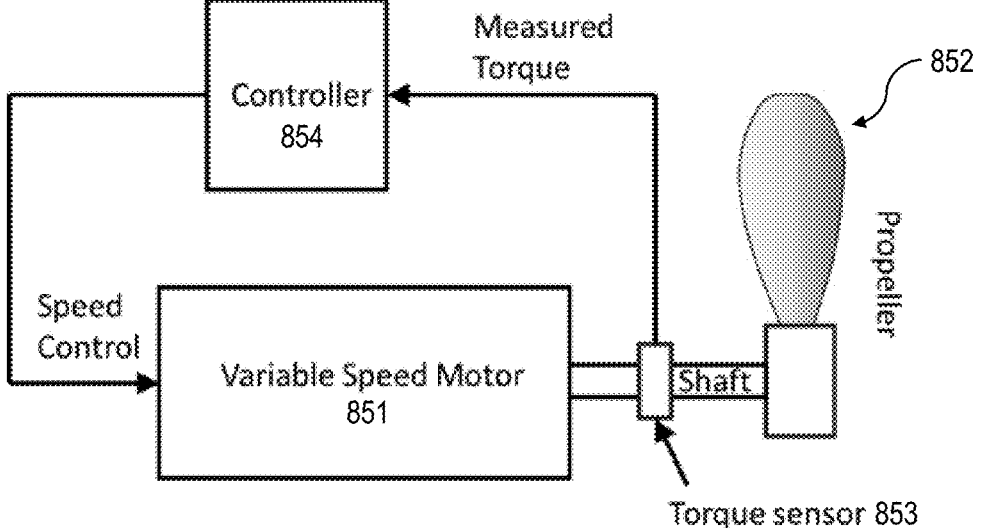
FIG. 8B is a schematic diagram of an example control system for adjusting propeller speed to maintain constant thrust at all propeller angles.

FIG. 8B is a schematic diagram of an example control system 850 for adjusting propeller speed to maintain constant thrust at all propeller angles. The control system 850 adjusts the speed of the motor 851 attached to the propeller 852. The control system measures the instantaneous torque which the motor is applying to the propeller using torque sensor 853, and adjusts the speed of the motor 851 to keep the measured torque constant throughout a rotation of the propeller. In this way, it ensures that the thrust generated by the propeller 852 is the same for all angles of rotation even though there is a density stratification in the medium 803. In such cases of density stratification, without a control system like the control system 850 shown in FIG. 8B, a constant rate of propeller rotation would generate greater thrust at those propeller angles where the propeller blade (or greater number of propeller blades) were in the denser fluid, causing the vehicle to turn toward the lighter fluid. In some implementations, the rotation rate throughout each cycle of rotation is adjusted to keep the instantaneous power being applied to the propeller constant for all angles of rotation, said instantaneous power being calculated, for example, as the sum over all coils in the propeller motor of the product of the instantaneous voltage times instantaneous current, where the motor is being driven by three sinusoidal phases 120 degrees apart as would be the case for a brushless motor driven by the method of field-oriented control (FOC). In brushless motor control methods which apply an instantaneous power that varies with motor angle (such as "trapezoidal control"), the controller 854 compensating for density stratification would adjust rotation rate to produce the instantaneous power profile that corresponds to a homogeneous fluid. The rotation rate can also be adjusted to be faster while the propeller is on one side of the vehicle than on the other side to generate greater thrust on the side with greater propeller speed to steer the vehicle without changing the axis of the propeller, i.e. without the additional mechanical complexity of having to pivot the propeller or having multiple off-axis propellers.

EMBODIMENTS

In an example implementation (or aspect), a wellhead attachment for deploying an untethered downhole tool into a well, the wellhead attachment comprising: a housing configured to house the untethered downhole tool; a relief valve in fluid communication with the housing and located at a first end of the wellhead attachment; a mounting flange located at a second end of the wellhead attachment, wherein the second end is opposite the first end, wherein the mounting flange is configured to couple to a tree of a well formed in a subterranean formation; and a gate valve coupled to the housing and the mounting flange, wherein the gate valve is positioned between the housing and the mounting flange, wherein the housing is positioned between the relief valve and the gate valve.

In an example implementation (or aspect) combinable with any other example implementation (or aspect), the wellhead attachment comprises a first pressure seal positioned between the relief valve and the housing, wherein the first pressure seal is configured to prevent leakage of fluid from between the relief valve and the housing.

In an example implementation (or aspect) combinable with any other example implementation (or aspect), the wellhead attachment comprises a second pressure seal positioned between the housing and the gate valve, wherein the second pressure seal is configured to prevent leakage of fluid from between the housing and the gate valve.

In an example implementation (or aspect) combinable with any other example implementation (or aspect), the wellhead attachment comprises a vent valve coupled to the housing and positioned between the relief valve and the housing.

In an example implementation (or aspect) combinable with any other example implementation (or aspect), the wellhead attachment comprises a first pressure seal positioned between the relief valve and the vent valve, wherein the first pressure seal is configured to prevent leakage of fluid from between the relief valve and the vent valve.

In an example implementation (or aspect) combinable with any other example implementation (or aspect), the wellhead attachment comprises a second pressure seal positioned between the vent valve and the housing, wherein the second pressure seal is configured to prevent leakage of fluid from between the vent valve and the housing.

In an example implementation (or aspect) combinable with any other example implementation (or aspect), the wellhead attachment comprises a third pressure seal positioned between the housing and the gate valve, wherein the third pressure seal is configured to prevent leakage of fluid from between the housing and the gate valve.

In an example implementation (or aspect), a method for deploying an untethered downhole tool into a well, the method comprising: placing the untethered downhole tool within a housing of a wellhead attachment, wherein the wellhead attachment a gate valve; after placing the untethered downhole tool within the housing, closing the gate valve; closing a master valve, a wing valve, and a swab valve of a tree of the well; after closing the master valve, the wing valve, and the swab valve, venting gas from a tree cap of the tree; after venting gas from the tree cap, removing the tree cap from the tree; installing the wellhead attachment to the tree, thereby replacing the removed tree cap; after installing the wellhead attachment to the tree, opening the swab valve; after opening the swab valve, opening the gate valve, thereby allowing the untethered downhole tool to descend from the housing into the tree below the swab valve; after the untethered downhole tool has descended into the tree, closing the gate valve and the swab valve; and after closing the gate valve and the swab valve, opening the master valve, thereby allowing the untethered downhole tool to descend from the tree into the well.

In an example implementation (or aspect) combinable with any other example implementation (or aspect), the method comprises, after opening the master valve, opening the wing valve to allow fluid flow into the well.

In an example implementation (or aspect) combinable with any other example implementation (or aspect), the method comprises, after installing the wellhead attachment to the tree and before opening the swab valve, pressure testing the wellhead attachment to verify absence of fluid leakage from between the tree and the wellhead attachment.

In an example implementation (or aspect) combinable with any other example implementation (or aspect), installing the wellhead attachment to the tree comprises lifting the wellhead attachment, with the untethered downhole tool positioned within the housing of the wellhead attachment, above the tree.

In an example implementation (or aspect) combinable with any other example implementation (or aspect), installing the wellhead attachment to the tree comprises installing a gasket on the tree where the tree cap was removed.

In an example implementation (or aspect) combinable with any other example implementation (or aspect), the wellhead attachment comprises a mounting flange, and installing the wellhead attachment to the tree comprises coupling the mounting flange of the wellhead attachment to the tree after installing the gasket.

In an example implementation (or aspect), a method for retrieving an untethered downhole tool from a well formed in a subterranean formation, the method comprising: opening a wing valve of a tree of the well, thereby allowing flow of fluid out of the well through the open wing valve and directing the untethered downhole tool into the tree; closing a master valve of the tree, thereby trapping the untethered downhole tool within the tree and stopping flow of fluid out of the well; after closing the master valve, closing the wing valve; flowing a fluid that is denser than the untethered downhole tool into the tree, thereby causing the untethered downhole tool to float out of the tree and into a wellhead attachment attached to the top of the tree, wherein the wellhead attachment comprises a gate valve; closing the gate valve of the wellhead attachment, thereby trapping the untethered downhole tool within the wellhead attachment; and after closing the gate valve, removing the wellhead attachment, with the untethered downhole tool positioned within the wellhead attachment, from the tree.

In an example implementation (or aspect) combinable with any other example implementation (or aspect), the method comprises, after closing the wing valve and before flowing the fluid that is denser than the untethered downhole tool into the tree, venting gas from the tree.

In an example implementation (or aspect) combinable with any other example implementation (or aspect), the fluid that is denser than the untethered downhole tool and flowed into the tree comprises water.

In an example implementation (or aspect) combinable with any other example implementation (or aspect), the fluid that is denser than the untethered downhole tool and flowed into the tree comprises a hydrocarbon.

In an example implementation (or aspect) combinable with any other example implementation (or aspect), the method comprises, after removing the wellhead attachment from the tree, installing a tree cap onto the tree where the wellhead attachment was removed.

In an example implementation (or aspect), an untethered downhole tool comprising: a housing configured to house control electronics, a power supply, and flotation members such that the tool is substantially neutrally buoyant in wellbore fluids, and wherein the housing defines a longitudinal axis; and a first propeller comprising at least one propeller blade, wherein said propeller is coupled to the power supply for receiving power from the power supply to rotate and is positioned at an end of the housing such that an axis of rotation of the propeller is substantially parallel and/or inline with the longitudinal axis of the housing for the untethered downhole tool to traverse a well.

In an example implementation (or aspect) combinable with any other example implementation (or aspect), the untethered downhole tool comprises a second propeller comprising at least one propeller blade, wherein the first and second propellers are coaxial and aligned with the longitudinal axis, wherein the first and second propellers are located at opposing ends of the housing, wherein the first propeller and the second propeller are configured such that by counter-rotating they produce thrust in the same direction, and wherein the first and second propellers move the untethered downhole tool within a well formed in a subterranean formation independent of a tether.

In an example implementation (or aspect) combinable with any other example implementation (or aspect), the floatation members within the housing comprise at least one of: a floatation material having a density less than 0.8 g/cc and a gas-filled volume protected by a pressure housing.

In an example implementation (or aspect) combinable with any other example implementation (or aspect), the second propeller is coupled to the first propeller via a direct drive in which rotation of the first propeller drives rotation of the second propeller in the opposite direction from the first propeller.

In an example implementation (or aspect) combinable with any other example implementation (or aspect), the first propeller and the second propeller are driven by separate motors and the speeds of the propellers are separately adjustable.

In an example implementation (or aspect) combinable with any other example implementation (or aspect), the untethered downhole tool comprises a fixed force having a component perpendicular to the longitudinal axis, a roll sensor, and control electronics which adjusts the speed of said two propellers to roll the vehicle to an orientation such that the fixed force causes the vehicle to turn in a desired direction.

In an example implementation (or aspect) combinable with any other example implementation (or aspect), the untethered downhole tool comprises an entry guide, a roll sensor, and control electronics which adjusts the speed of said two propellers to roll the vehicle to an orientation such that the tip of the entry guide is placed at the entry of a hole and apply forward thrust causing the vehicle to enter the hole.

In an example implementation (or aspect) combinable with any other example implementation (or aspect), the untethered downhole tool comprises a sensor which has a maximum sensitivity to properties of interest in a certain direction, a roll sensor, and control electronics which adjusts the speed of said two propellers to roll the vehicle to position the sensor at a desired orientation.

In an example implementation (or aspect) combinable with any other example implementation (or aspect), the pitch angle of at least one blade of the propeller is adjustable.

In an example implementation (or aspect) combinable with any other example implementation (or aspect), the propeller has an asymmetrical arrangement of blades and/or has an odd number of propeller blades.

In an example implementation (or aspect), a method for performing an untethered downhole operation in a well formed in a subterranean formation, the method comprising: housing, while submerged in well fluid within the well, a logging tool and a power supply within a housing defining a longitudinal axis; rotating a first propeller in a first direction; while rotating the first propeller in the first direction, rotating a second propeller in a second direction that is opposite the first direction, wherein the first and second propellers are coaxial and aligned with the longitudinal axis, wherein the first and second propellers are located at opposing ends of the housing, wherein the housing, the logging tool, the power supply, the first propeller, and the second propeller are part of an untethered downhole tool independent of a tether extending from a surface of the Earth, wherein rotating the first propeller in the first direction and rotating the second propeller in the second direction produces thrust for moving the untethered downhole tool within the well; and while rotating the first propeller in the first direction and rotating the propeller in the second direction, obtaining logging data about the well, by the logging tool, as the untethered downhole tool moves within the well.

In an example implementation (or aspect) combinable with any other example implementation (or aspect), the logging tool and the power supply are offset from the longitudinal axis, such that the logging tool and the power supply are prevented from being centralized within the housing.

In an example implementation (or aspect) combinable with any other example implementation (or aspect), the logging tool and the power supply are positioned offset from the longitudinal axis such that the logging tool and the power supply are positioned below the longitudinal axis with respect to gravity when the untethered downhole tool is oriented horizontally.

In an example implementation (or aspect) combinable with any other example implementation (or aspect), the logging tool and the power supply are positioned within the housing such that there is a non-zero vertical separation between a center of mass of the untethered downhole tool and a center of buoyancy of the untethered downhole tool.

In an example implementation (or aspect) combinable with any other example implementation (or aspect), the second propeller is coupled to the first propeller via a direct drive, and rotation of the first propeller drives rotation of the second propeller.

In an example implementation (or aspect) combinable with any other example implementation (or aspect), the first propeller and the second propeller rotate at different speeds.

In an example implementation (or aspect) combinable with any other example implementation (or aspect), the method comprises adjusting the rotating speed of at least one of the first propeller or the second propeller.

In an example implementation (or aspect) combinable with any other example implementation (or aspect), the method comprises adjusting a pitch angle of at least one of the first propeller or the second propeller.

In an example implementation (or aspect) combinable with any other example implementation (or aspect), at least one of the first propeller or the second propeller is symmetrical and comprises an odd number of propeller blades.

In an example implementation (or aspect), an untethered downhole tool comprises: a housing configured to house a logging tool and a power supply, wherein the housing defines a longitudinal axis; a first propeller comprising a first plurality of propeller blades, wherein the first propeller is coupled to the power supply for receiving power from the power supply to rotate; and a second propeller comprising a second plurality of propeller blades, wherein the first and second propellers are coaxial and aligned with the longitudinal axis, wherein the first and second propellers are located at opposing ends of the housing, wherein the first plurality of propeller blades and the second plurality of propeller blades are configured to counter-rotate around the longitudinal axis defined by the housing to produce thrust for moving the untethered downhole tool within a well formed in a subterranean formation independent of a tether.

In an example implementation (or aspect) combinable with any other example implementation (or aspect), the logging tool and the power supply are offset from the longitudinal axis, such that the logging tool and the power supply are prevented from being centralized within the housing.

In an example implementation (or aspect) combinable with any other example implementation (or aspect), the logging tool and the power supply are positioned offset from the longitudinal axis such that the logging tool and the power supply are positioned below the longitudinal axis with respect to gravity when the untethered downhole tool is oriented horizontally.

In an example implementation (or aspect) combinable with any other example implementation (or aspect), the logging tool and the power supply are positioned within the housing such that there is a non-zero vertical separation between a center of mass of the untethered downhole tool and a center of buoyancy of the untethered downhole tool.

In an example implementation (or aspect) combinable with any other example implementation (or aspect), the second propeller is coupled to the first propeller via a direct drive in which rotation of the first propeller drives rotation of the second propeller.

In an example implementation (or aspect) combinable with any other example implementation (or aspect), the first propeller and the second propeller are configured to rotate at different speeds.

In an example implementation (or aspect) combinable with any other example implementation (or aspect), the speeds at which the first propeller and the second propeller rotate are adjustable.

In an example implementation (or aspect) combinable with any other example implementation (or aspect), the first propeller is adjustable such that a pitch angle of the first plurality of propeller blades is adjustable.

In an example implementation (or aspect) combinable with any other example implementation (or aspect), the second propeller is adjustable such that a pitch angle of the second plurality of propeller blades is adjustable.

In an example implementation (or aspect) combinable with any other example implementation (or aspect), at least one of the first plurality of propeller blades or the second plurality of propeller blades is asymmetrical.

In an example implementation (or aspect) combinable with any other example implementation (or aspect), at least one of the first plurality of propeller blades or the second plurality of propeller blades is symmetrical and has an odd number of propeller blades.

In an example implementation (or aspect), a method for performing an untethered downhole operation in a well formed in a subterranean formation, the method comprising: housing, while submerged in well fluid within the well, a logging tool and a power supply within a housing defining a longitudinal axis; rotating a first propeller in a first direction; while rotating the first propeller in the first direction, rotating a second propeller in a second direction that is opposite the first direction, wherein the first and second propellers are coaxial and aligned with the longitudinal axis, wherein the first and second propellers are located at opposing ends of the housing, wherein the housing, the logging tool, the power supply, the first propeller, and the second propeller are part of an untethered downhole tool independent of a tether extending from a surface of the Earth, wherein rotating the first propeller in the first direction and rotating the second propeller in the second direction produces thrust for moving the untethered downhole tool within the well; and while rotating the first propeller in the first direction and rotating the propeller in the second direction, obtaining logging data about the well, by the logging tool, as the untethered downhole tool moves within the well.

In an example implementation (or aspect) combinable with any other example implementation (or aspect), the logging tool and the power supply are offset from the longitudinal axis, such that the logging tool and the power supply are prevented from being centralized within the housing.

In an example implementation (or aspect) combinable with any other example implementation (or aspect), the logging tool and the power supply are positioned offset from the longitudinal axis such that the logging tool and the power supply are positioned below the longitudinal axis with respect to gravity when the untethered downhole tool is oriented horizontally.

In an example implementation (or aspect) combinable with any other example implementation (or aspect), the logging tool and the power supply are positioned within the housing such that there is a non-zero vertical separation between a center of mass of the untethered downhole tool and a center of buoyancy of the untethered downhole tool.

In an example implementation (or aspect) combinable with any other example implementation (or aspect), the second propeller is coupled to the first propeller via a direct drive, and rotation of the first propeller drives rotation of the second propeller.

In an example implementation (or aspect) combinable with any other example implementation (or aspect), the first propeller and the second propeller rotate at different speeds.

In an example implementation (or aspect) combinable with any other example implementation (or aspect), the method comprises adjusting the rotating speed of at least one of the first propeller or the second propeller.

In an example implementation (or aspect) combinable with any other example implementation (or aspect), the method comprises adjusting a pitch angle of at least one of the first propeller or the second propeller.

In an example implementation (or aspect) combinable with any other example implementation (or aspect), at least one of the first propeller or the second propeller is symmetrical and comprises an odd number of propeller blades.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An untethered downhole tool comprising:

a housing configured to house a logging tool and a power supply, wherein the housing defines a longitudinal axis, wherein the logging tool and the power supply are offset from the longitudinal axis, such that the logging tool and the power supply are prevented from being centralized within the housing;

a first propeller comprising a first plurality of propeller blades, wherein the first propeller is coupled to the power supply for receiving power from the power supply to rotate; and a second propeller comprising a second plurality of propeller blades, wherein the first and second propellers are coaxial and aligned with the longitudinal axis, wherein the first and second propellers are located at opposing ends of the housing, wherein the first plurality of propeller blades and the second plurality of propeller blades are configured to counter-rotate around the longitudinal axis defined by the housing to produce thrust for moving the untethered downhole tool within a well formed in a subterranean formation independent of a tether.

2. The untethered downhole tool of claim 1, wherein the logging tool and the power supply are positioned offset from the longitudinal axis such that the logging tool and the power supply are positioned below the longitudinal axis with respect to gravity when the untethered downhole tool is oriented horizontally.

3. The untethered downhole tool of claim 2, wherein the logging tool and the power supply are positioned within the housing such that there is a non-zero vertical separation between a center of mass of the untethered downhole tool and a center of buoyancy of the untethered downhole tool.

4. The untethered downhole tool of claim 3, wherein the second propeller is coupled to the first propeller via a direct drive in which rotation of the first propeller drives rotation of the second propeller.

5. The untethered downhole tool of claim 4, wherein the first propeller and the second propeller are configured to rotate at different speeds.

6. The untethered downhole tool of claim 5, wherein the speeds at which the first propeller and the second propeller rotate are adjustable.

7. The untethered downhole tool of claim 6, wherein the first propeller is adjustable such that a pitch angle of the first plurality of propeller blades is adjustable.

8. The untethered downhole tool of claim 7, wherein the second propeller is adjustable such that a pitch angle of the second plurality of propeller blades is adjustable.

9. The untethered downhole tool of claim 8, wherein at least one of the first plurality of propeller blades or the second plurality of propeller blades is asymmetrical.

10. The untethered downhole tool of claim 8, wherein at least one of the first plurality of propeller blades or the second plurality of propeller blades is symmetrical and has an odd number of propeller blades.

11. A method for performing an untethered downhole operation in a well formed in a subterranean formation, the method comprising:

housing, while submerged in well fluid within the well, a logging tool and a power supply within a housing defining a longitudinal axis, wherein the logging tool and the power supply are offset from the longitudinal axis, such that the logging tool and the power supply are prevented from being centralized within the housing;

rotating a first propeller in a first direction;

while rotating the first propeller in the first direction, rotating a second propeller in a second direction that is opposite the first direction, wherein the first and second propellers are coaxial and aligned with the longitudinal axis, wherein the first and second propellers are located at opposing ends of the housing, wherein the housing, the logging tool, the power supply, the first propeller, and the second propeller are part of an untethered downhole tool independent of a tether extending from a surface of the Earth, wherein rotating the first propeller in the first direction and rotating the second propeller in the second direction produces thrust for moving the untethered downhole tool within the well; and while rotating the first propeller in the first direction and rotating the propeller in the second direction, obtaining logging data about the well, by the logging tool, as the untethered downhole tool moves within the well.

12. The method of claim 11, wherein the logging tool and the power supply are positioned offset from the longitudinal axis such that the logging tool and the power supply are positioned below the longitudinal axis with respect to gravity when the untethered downhole tool is oriented horizontally.

13. The method of claim 12, wherein the logging tool and the power supply are positioned within the housing such that there is a non-zero vertical separation between a center of mass of the untethered downhole tool and a center of buoyancy of the untethered downhole tool.

14. The method of claim 13, wherein the second propeller is coupled to the first propeller via a direct drive, and rotation of the first propeller drives rotation of the second propeller.

15. The method of claim 14, wherein the first propeller and the second propeller rotate at different speeds.

16. The method of claim 15, comprising adjusting the rotating speed of at least one of the first propeller or the second propeller.

17. The method of claim 16, comprising adjusting a pitch angle of at least one of the first propeller or the second propeller.

18. The method of claim 17, wherein at least one of the first propeller or the second propeller is symmetrical and comprises an odd number of propeller blades.

* * * * *